US010353499B2

(12) United States Patent
Laflamme et al.

(10) Patent No.: US 10,353,499 B2
(45) Date of Patent: *Jul. 16, 2019

(54) TOPSIDE CONTROL PANEL FOR BATHING UNIT SYSTEM

(71) Applicant: GECKO ALLIANCE GROUP INC., Quebec (CA)

(72) Inventors: Benoit Laflamme, Quebec (CA); Martin Caouette, Quebec (CA)

(73) Assignee: GECKO ALLIANCE GROUP INC., Québec, QC (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/924,550

(22) Filed: Mar. 19, 2018

(65) Prior Publication Data
US 2018/0217692 A1 Aug. 2, 2018

Related U.S. Application Data

(62) Division of application No. 14/798,906, filed on Jul. 14, 2015.

(51) Int. Cl.
*G06F 3/041* (2006.01)
*G06F 3/01* (2006.01)
(Continued)

(52) U.S. Cl.
CPC .............. *G06F 3/041* (2013.01); *A47K 3/00* (2013.01); *G02F 1/133308* (2013.01);
(Continued)

(58) Field of Classification Search
CPC ........ G06F 3/044; G06F 3/041; G06F 1/1626; G06F 3/0484
See application file for complete search history.

(56) References Cited

U.S. PATENT DOCUMENTS

D333,574 S 3/1993 Ackeret
D342,233 S 12/1993 Berlin et al.
(Continued)

FOREIGN PATENT DOCUMENTS

CN 201702053 1/2011

OTHER PUBLICATIONS

Non-Final Office Action dated Sep. 16, 2016 in connection with U.S. Appl. No. 14/798,906—16 pages.
(Continued)

*Primary Examiner* — Md Saiful A Siddiqui

(57) ABSTRACT

A topside control panel for a bathing unit system is provided. The topside control panel comprises a housing including a top surface and a bottom surface opposed to the top surface and a display touch or presence-sensitive assembly positioned upon the top surface of the housing. The topside control panel also includes a circuit board assembly positioned upon the bottom surface the housing. In some embodiments, the bottom surface may be circumscribed by a bottom peripheral wall, which with the bottom surface defines a recess in which is positioned the circuit board assembly. A back panel may be secured to the housing so as to enclose the second recess and form an enclosed space. The back panel may include a ventilation member configured for allowing air communication between the enclosed space and a space external to the topside control panel. In another aspect, a topside control panel having a cover frame including a cut out or window area may be provided for receiving the display touch or presence-sensitive assembly when assembled with the housing and may allow for customizing the aesthetic appearance of the topside control panel by selecting cover frames having different appearances.

24 Claims, 23 Drawing Sheets

(51) Int. Cl.
*G06F 3/0488* (2013.01)
*G06F 1/16* (2006.01)
*G02F 1/1333* (2006.01)
*A47K 3/00* (2006.01)
*A61H 33/00* (2006.01)

(52) U.S. Cl.
CPC ............ *G06F 1/1601* (2013.01); *G06F 3/016* (2013.01); *G06F 3/0488* (2013.01); *A61H 33/60* (2013.01); *A61H 2201/0103* (2013.01); *A61H 2201/5046* (2013.01); *G02F 2001/133311* (2013.01)

(56) References Cited

U.S. PATENT DOCUMENTS

| | | |
|---|---|---|
| D353,363 S | 12/1994 | Toby |
| D367,878 S | 3/1996 | Lee et al. |
| D378,438 S | 3/1997 | Sliney |
| 5,709,156 A | 1/1998 | Gavaert et al. |
| D395,283 S | 6/1998 | Monaco et al. |
| D465,201 S | 11/2002 | Gershfeld |
| D467,230 S | 12/2002 | Byrne |
| D468,701 S | 1/2003 | Byrne |
| D472,213 S | 3/2003 | Byrne |
| D486,452 S | 2/2004 | Dinh |
| D504,889 S | 5/2005 | Andre |
| D517,311 S | 3/2006 | Kim |
| D517,482 S | 3/2006 | Nipke |
| D549,451 S | 8/2007 | Sann |
| D550,210 S | 9/2007 | Polany et al. |
| D560,170 S | 1/2008 | Ni |
| D561,472 S | 2/2008 | Nakamura |
| D578,960 S | 10/2008 | Fisher et al. |
| 7,456,574 B2 | 11/2008 | Hong et al. |
| D584,711 S | 1/2009 | Kim |
| D584,738 S | 1/2009 | Kim |
| D586,787 S | 2/2009 | Rivard |
| D586,800 S | 2/2009 | Andre |
| D591,682 S | 5/2009 | Lin |
| D596,173 S | 7/2009 | Arfin |
| D597,067 S | 7/2009 | Oh |
| D600,690 S | 9/2009 | Miyaji |
| D601,127 S | 9/2009 | Rivard et al. |
| D602,488 S | 10/2009 | Jiang |
| D614,871 S | 5/2010 | Tang |
| D621,548 S | 8/2010 | Chen |
| D625,928 S | 10/2010 | Lee |
| D627,777 S | 11/2010 | Akana |
| D636,769 S | 4/2011 | Wood |
| D643,007 S | 8/2011 | Song |
| D647,303 S | 10/2011 | Mish et al. |
| D650,784 S | 12/2011 | Feldstein et al. |
| D652,390 S | 1/2012 | Boehm et al. |
| D654,077 S | 2/2012 | Radin et al. |
| 8,149,222 B2 | 4/2012 | Hsieh |
| D658,591 S | 5/2012 | Margolin et al. |
| 8,172,604 B2 | 5/2012 | Byrne |
| D667,396 S | 9/2012 | Koh |
| 8,273,825 B2 | 9/2012 | Lin et al. |
| D669,444 S | 10/2012 | Shin et al. |
| D675,612 S | 2/2013 | Andre |
| 8,369,082 B2 | 2/2013 | Madonna et al. |
| D677,660 S | 3/2013 | Groene et al. |
| D678,215 S | 3/2013 | Brantley et al. |
| D684,872 S | 6/2013 | Bias |
| D684,936 S | 6/2013 | Brantley et al. |
| 8,498,103 B2 | 7/2013 | Graneto, III |
| D690,661 S | 10/2013 | Wisniewski et al. |
| D690,693 S | 10/2013 | Akana et al. |
| D692,008 S | 10/2013 | Feldstein et al. |
| D693,340 S | 11/2013 | Ohshima et al. |
| D694,195 S | 11/2013 | Gammon et al. |
| D695,702 S | 12/2013 | Klm |
| 8,690,590 B2 | 4/2014 | Byrne |
| D713,830 S | 9/2014 | Dhondt et al. |
| 8,873,226 B1 | 10/2014 | Peters |
| D720,358 S | 12/2014 | Ginsterblum |
| D721,377 S | 1/2015 | Pelster et al. |
| 8,951,054 B2 | 2/2015 | Byrne |
| D727,857 S | 4/2015 | Acera et al. |
| D729,793 S | 5/2015 | Hickoc |
| 9,069,201 B2 | 6/2015 | Pipitone et al. |
| D734,179 S | 7/2015 | Golden |
| D734,610 S | 7/2015 | Christie |
| D738,204 S | 9/2015 | Akana et al. |
| D743,349 S | 11/2015 | Leeland |
| D744,433 S | 12/2015 | Baumgartner |
| D752,517 S | 3/2016 | Scott et al. |
| D752,568 S | 3/2016 | Kang et al. |
| D759,018 S | 6/2016 | Subramaniam et al. |
| D759,642 S | 6/2016 | Chao |
| D769,231 S | 10/2016 | Kwak et al. |
| D770,973 S | 11/2016 | Toth |
| D777,119 S | 1/2017 | Lin |
| D804,451 S | 12/2017 | Isabelle |
| 9,869,594 B2 | 1/2018 | Scalera |
| 2004/0095332 A1 | 5/2004 | Blanchard |
| 2005/0123161 A1 | 6/2005 | Polany et al. |
| 2007/0274101 A1* | 11/2007 | Cho ............... H04M 1/22 362/615 |
| 2008/0012734 A1 | 1/2008 | Ciechanowski et al. |
| 2008/0024462 A1 | 1/2008 | Kim et al. |
| 2008/0298082 A1 | 12/2008 | Churchwell |
| 2009/0106890 A1 | 4/2009 | Rosenau |
| 2010/0038223 A1 | 2/2010 | Laurent |
| 2010/0070059 A1 | 3/2010 | Laflamme et al. |
| 2010/0304934 A1 | 12/2010 | Woodson et al. |
| 2011/0037851 A1 | 2/2011 | Kim et al. |
| 2012/0050988 A1 | 3/2012 | Rothkopf et al. |
| 2012/0068832 A1 | 3/2012 | Feldstein et al. |
| 2012/0092812 A1 | 4/2012 | Lewis et al. |
| 2012/0162953 A1* | 6/2012 | Wojack ............ G06F 1/1626 361/809 |
| 2013/0027892 A1 | 1/2013 | Lim et al. |
| 2013/0161489 A1 | 6/2013 | Gardner, Jr. |
| 2013/0271950 A1 | 10/2013 | Park |
| 2013/0279142 A1 | 10/2013 | Wang et al. |
| 2014/0043256 A1 | 2/2014 | Wu et al. |
| 2014/0262481 A1 | 9/2014 | Khoury et al. |
| 2014/0300567 A1 | 10/2014 | Inata et al. |
| 2014/0327624 A1* | 11/2014 | Srinivas ............ G06F 1/1626 345/173 |
| 2015/0021064 A1 | 1/2015 | Wang et al. |
| 2015/0055034 A1* | 2/2015 | Pipitone .......... G02F 1/133308 349/12 |
| 2015/0062087 A1 | 3/2015 | Cho et al. |
| 2015/0196456 A1* | 7/2015 | Nicholson ......... A61H 33/005 349/12 |
| 2015/0220116 A1 | 8/2015 | Kemppinene et al. |
| 2015/0315737 A1* | 11/2015 | Yang ............... F21V 33/0044 362/23.04 |
| 2016/0324026 A1 | 11/2016 | Kang et al. |
| 2017/0017315 A1 | 1/2017 | Laflamme et al. |
| 2018/0018051 A1 | 1/2018 | Ogura |

OTHER PUBLICATIONS

Examiner's Report dated Nov. 28, 2016 in connection with Canadian Patent Application No. 2,897,248—4 pages.
Office Action dated Dec. 30, 2016 in connection with Design U.S. Appl. No. 29/531,050—5 pages.
Final Office Action dated Apr. 13, 2017 in connection with U.S. Appl. No. 14/798,906—22 pages.
Non-final Office Action dated Apr. 18, 2017 in connection with Design U.S. Appl. No. 29/531,050—23 pages.
Office Action dated May 10, 2017 in connection with Design U.S. Appl. No. 29/547,230—17 pages.
Examiner's Report dated Jun. 14, 2017 in connection with Canadian Patent No. 2,897,248—6 pages.
Notice of Allowability dated Jul. 24, 2017 in connection with Design U.S. Appl. No. 29/547,230—29 pages.

(56) References Cited

OTHER PUBLICATIONS

Final Office Action dated Oct. 11, 2017 in connection with Design U.S. Appl. No. 29/531,050—20 pages.
Non-Final Office Action dated Nov. 29, 2017 in connection with U.S. Appl. No. 14/798,906—26 pages.
Top-side spa panels (document 1)—dated Jun. 22, 2015.
Top-side spa panels (document 2)—dated Jun. 22, 2015.
Top-side spa panels (document 3)—dated Jun. 22, 2015.
Media Player Docking Station for Bathing Unit or Watercraft. (Design—© Questel). Orbit.com. [online PDF] 8 pgs. Print Date Feb. 16, 2016 [retrieved on Jul. 13, 2017] https://sobjprd.questel.fr/export/QPTUJ214/pdf2/e5fdea9d-f1c7-4d0a-9b21-2081cb3d7daa-232954.pdf.
Examiner's report dated Mar. 21, 2018 in connection with CA application 2,897,248—5 pages.
Notice of Non-compliant Amendment dated Apr. 13, 2018 in connection with U.S. Appl. No. 14/798,906—3 pages.
Examiner's report dated Aug. 13, 2018 in connection with CA application 2,985,901—4 pages.
Final Office Action dated Sep. 28, 2018 in connection with U.S. Appl. No. 14/798,906—61 pages.
Notice of Allowance dated Oct. 30, 2018 in connection with Design U.S. Appl. No. 29/594,361—42 pages.
Examiner's Report dated Dec. 13, 2018 in connection with CA Application No. 2,897,248—7 pages.
Non-Final Office Action dated Apr. 2, 2019 in connection with U.S. Appl. No. 14/798,906—35 Pages.

\* cited by examiner

TOPSIDE CONTROL PANEL FOR BATHING UNIT SYSTEM

CROSS-REFERENCE TO RELATED APPLICATION

This application is a divisional claiming the benefit of priority under 35 USC § 121 based on co-pending U.S. patent application Ser. No. 14/798,906 filed Jul. 14, 2015. The contents of the above-noted application are incorporated herein by reference.

FIELD OF THE INVENTION

The present invention relates generally to the field of control systems for bathing unit systems, and more specifically, to a topside control panel to provide a user with control and/or monitoring capabilities in connection with a bathing unit system.

BACKGROUND

Bathing units, such as spas, typically include various bathing unit components that are used in operating the bathing system. The bathing unit components generally include pumps that circulate water through a piping system, pumps for activating water jets, at least one heating module to heat the water, a filter system, an air blower, an ozone generator, a lighting system, and a control system that activate and manage the various operational settings of the bathing unit components. Other types of bathing units that have similar components include, for instance, whirlpools, hot tubs, bathtubs, therapeutic baths, spas and swimming pools. Most modern bathing systems include a control panel that is in communication with the bathing unit control system. The control panel is typically positioned in proximity to the bathing system so that a user of the bathing system may interact with it in order to adjust and control the activation and settings of the various bathing unit components.

Positioning the control panel in proximity to the bathing unit system, for example on a portion of an outer peripheral wall of the bathing unit system, presents a challenge. While such proximity of the control panel to the bathing unit system facilitates user interactions with the control panel, this proximity increases detrimental exposure of the control panel internal and external components to moisture. As a result, this detrimental moisture exposure may increase, for example, sanitary (e.g., mildew), integrity (e.g., rust), operability/safety (e.g., water-induced short circuits) risks to the control panel, as well as other risks which can be apparent to the person of skill.

One approach for addressing the above issue is to construct the control panel using water-resistant sealing material, such as silicone, to at least partially fill air gaps present in the control panel device structure through which moisture could penetrate. The use of such water-resistant sealing material may effectively block water entry in the device and thus avoid the control panel internal components being exposed to moisture. A deficiency of such an approach is that it requires the owner of the bathing unit system to monitor and maintain the sealing material integrity, which would attract additional costs and efforts for operating the bathing system.

Another challenge associated with control panels is that different bathing unit manufacturers as well as different user may have different preferences in terms of the visual appearance of the control panels. To satisfy these different customers, different versions of the control panels need to be designed, manufactured and maintained in inventory. Such customization tends to increase the manufacturing cost of individual control panels and thus may increase the price paid by the end consumer.

Against the background described above, there remains a need in the industry to provide a topside control panel for a bathing unit system that alleviates at least in part the problems associated with existing control panels of the type described above.

SUMMARY

In accordance with a first aspect, a topside control panel for a bathing unit system is provided comprising:
a. a housing including a top surface and a bottom surface opposed to the top surface;
b. a display touch or presence-sensitive assembly positioned upon the top surface of the housing; and
c. a circuit board assembly positioned upon the bottom surface the housing, the circuit board assembly being electrically coupled to the display touch or presence-sensitive assembly.

In some implementations, the top surface of the housing may be circumscribed by a peripheral edge for engaging the display touch or presence-sensitive assembly. A sealing material, such as for example a gasket, may secure the display touch or presence-sensitive assembly to the housing. In some specific implementations, the peripheral edge may include a groove or channel and the sealing material securing the display touch or presence-sensitive assembly to the housing may be positioned within the groove or channel.

In some implementations, the topside control panel may further comprise a cover frame including a cut out or window area for receiving the display touch or presence-sensitive assembly when assembled with the housing. Optionally, the cover frame may be releasably fastened to the housing of the topside control panel through the use of suitable fasteners for allowing for the easy removal and/or fastening/re-fastening of the cover frame to the housing.

In some implementations, the display touch or presence-sensitive assembly includes an electronic display, a touch or presence-sensitive layer, and a cover layer overlying a top surface of the touch or presence-sensitive layer. The cover layer of the touch or presence-sensitive assembly may include one or more translucent or transparent areas. In specific practical implementations, the display touch or presence-sensitive assembly may be responsive to changes in capacitance resulting from touching or close proximity of an object to the touch or presence-sensitive layer to generate and transmit signals to a processor located on the circuit board assembly.

In specific practical implementations, one of the one or more translucent or transparent areas may be associated with an ambient light sensor positioned on the circuit board assembly. This may allow adapting the intensity and/or color of the images displayed by the electronic display to be conditioned at least in part on the basis of the detected amount of ambient light, for example to make the displayed images more pleasing to the user of the bathing unit system. The cover layer of the touch or presence-sensitive assembly preferably may include a tactile zone providing haptic feedback and/or a mechanical actuator for associating user tactile input to software-implemented actions. In specific practical implementations, the cover layer is comprised at least in part of a glass material.

In accordance with another aspect, a topside control panel for a bathing unit system is provided comprising:

a. a display touch or presence-sensitive assembly;
b. a housing having:
   i. a top surface circumscribed by a top peripheral wall, the top surface and the top peripheral wall defining a first recess for receiving the display touch or presence-sensitive assembly;
   ii. a bottom surface opposed to the top surface, the bottom surface being circumscribed by a bottom peripheral wall, the bottom surface and the bottom peripheral wall defining a second recess; and
c. a circuit board assembly positioned in the second recess of the housing, the circuit board assembly being electrically coupled to the display touch or presence-sensitive assembly.

In at least some specific implementations, the bottom surface may include a plurality of standoffs protruding therefrom for contacting the circuit board assembly. The bottom surface may also include a plurality of mounting brackets protruding therefrom for securing the circuit board assembly within the second recess.

In some specific implementations, the top surface of the housing is circumscribed by a peripheral edge for engaging the display touch or presence-sensitive assembly and a sealing material may be used to secure the display touch or presence-sensitive assembly to the housing. The peripheral edge may in some cases include a groove or channel and the sealing material securing the display touch or presence-sensitive assembly to the housing may be positioned within the groove or channel.

In accordance with another aspect, a topside control panel for a bathing unit is provided comprising:

a display touch or presence-sensitive assembly;
a housing including:
   i. a top surface circumscribed by a top peripheral wall, the top surface and the top peripheral wall defining a first recess for receiving the display touch or presence-sensitive assembly; and
   ii. a bottom surface opposed to the top surface, the bottom surface being circumscribed by a bottom peripheral wall, the bottom surface and the bottom peripheral wall defining a second recess; and
a back panel secured to the housing so as to enclose the second recess and form an enclosed space, the back panel including a ventilation member configured for allowing air communication between the enclosed space and a space external to the topside control panel.

In some specific implementations, a circuit board assembly may be positioned within the second recess, the circuit board assembly being electrically coupled to the display touch or presence-sensitive assembly. The top surface of the housing may be circumscribed by a peripheral edge for engaging the display touch or presence-sensitive assembly.

In some specific implementations, the ventilation member may be comprised of an elongated hollow member extending from an aperture formed on a wall of the back panel.

In accordance with another aspect, a topside control panel for a bathing unit is provided comprising:

a. a display touch or presence-sensitive assembly;
b. a housing including:
   i. a top surface circumscribed by a top peripheral wall, the top surface and the top peripheral wall defining a first recess for receiving the display touch or presence-sensitive assembly so as to enclose at least part of the first recess and form a first enclosed space; and
   ii. a bottom surface circumscribed by a bottom peripheral wall, the bottom surface and the bottom peripheral wall defining a second recess; and
c. a back panel secured to the housing so as to enclose at least part of the second recess to form a second enclosed space defined at least in part by the back panel, the bottom peripheral wall of the housing and the bottom surface of the housing, wherein a ventilation path is formed between the top surface and the bottom surface of the housing to allow air communication between the first enclosed space and the second enclosed space.

In some specific implementations, the back panel may include a ventilation member configured for allowing air communication between the enclosed second space and a space external to the topside control panel. In some practical implementations, the ventilation member may be comprised of an elongated hollow member extending from an aperture formed on a wall of the back panel. A circuit board assembly may be positioned within the second enclosed space of the housing.

In accordance with another aspect, a bathing unit is provided comprising:

a. a receptacle for holding water;
b. a plurality of comfort components including at least a circulation pump and a heater;
c. a controller for controlling operational settings associated with the comfort components; and
d. a topside control panel of the type described above, the topside control panel being in communication with the controller for allowing a user of the bathing unit system to control and/or monitor operational settings of at least some of the comfort components in the bathing unit system.

In specific implementations, the receptacle for holding water may include a peripheral wall on which the control panel is positioned.

All features of embodiments which are described in this disclosure and are not mutually exclusive can be combined with one another. Elements of one embodiment can be utilized in the other embodiments without further mention. Other aspects and features of the present invention will become apparent to those ordinarily skilled in the art upon review of the following description of specific embodiments in conjunction with the accompanying Figures.

BRIEF DESCRIPTION OF THE DRAWINGS

A detailed description of specific embodiments is provided herein below, by way of example only, with reference to the accompanying drawings, in which.

Figure 1:
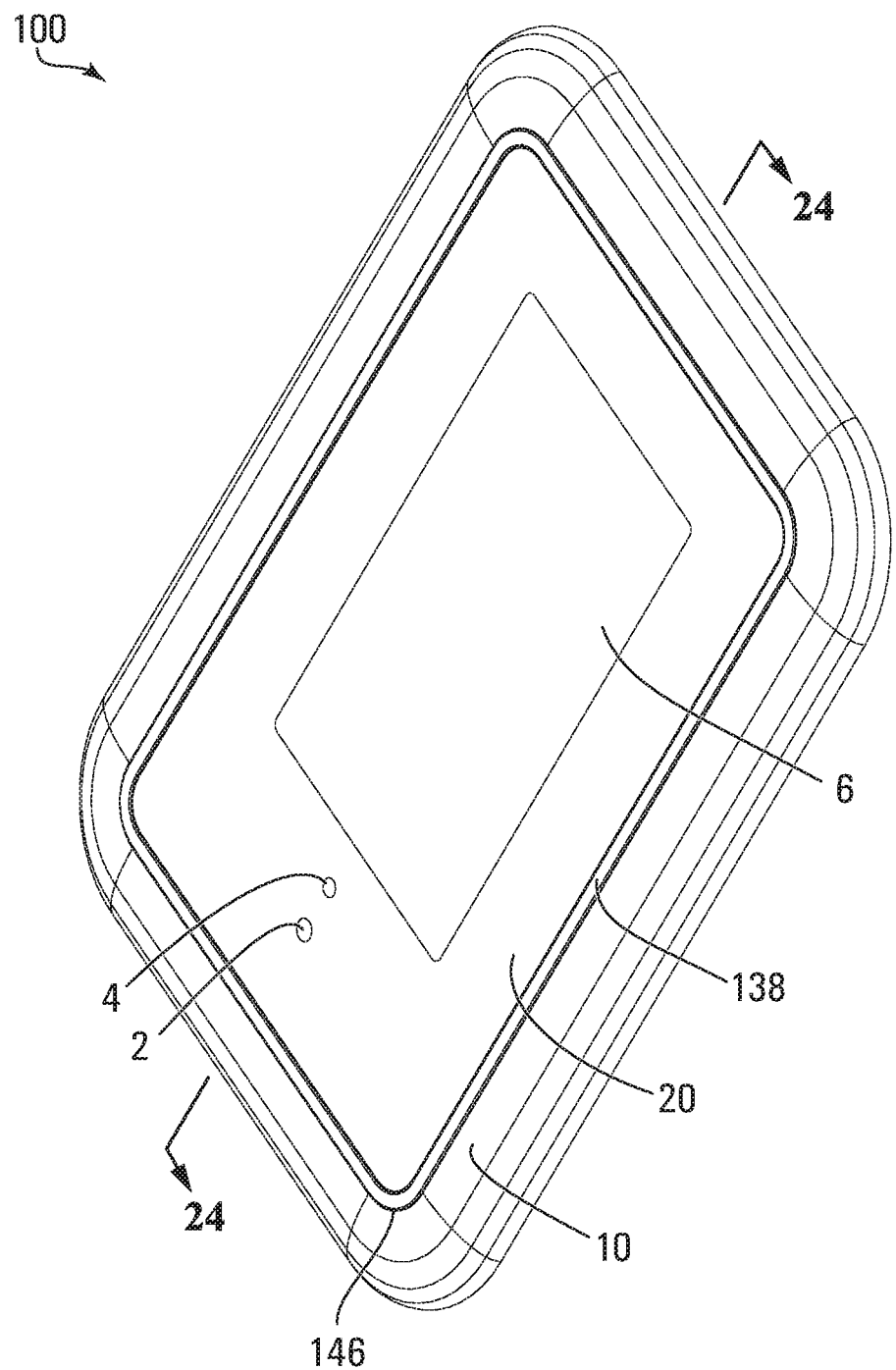
FIG. 1 shows a top isometric view of a topside control panel for a bathing unit in accordance with a non-limiting example of implementation of the invention.

In the drawings, the embodiments of the invention are illustrated by way of examples. It is to be expressly understood that the description and drawings are only for the purpose of illustration and are an aid for understanding. They are not intended to be a definition of the limits of the invention.

DETAILED DESCRIPTION

The description below is directed to a specific implementation of a topside control panel according to principles of the invention in the context of a bathing system. It is to be understood that the term "bathing system", as used for the purposes of the present description, refers to spas, whirlpools, hot tubs, bathtubs, therapeutic baths, swimming pools and any other type of bathing unit that can be equipped with a control system for controlling various operational settings of the bathing units.

FIGS. 1-5 show a topside control panel 100 in accordance with a specific example of implementation. The control panel 100 includes a housing 50, which conceptually, divides the control panel 100 into an upper housing subassembly 350 and a bottom housing subassembly 360. FIGS. 6-11 illustrate in more details certain features/components of a non-limiting embodiment of the upper housing subassembly 350, whereas FIGS. 12-19 illustrate in more details certain features/components of a non-limiting embodiment of the bottom housing subassembly 360.

The following section describes in more details a non-limiting example of implementation of the upper housing subassembly 350.

Figure 2:
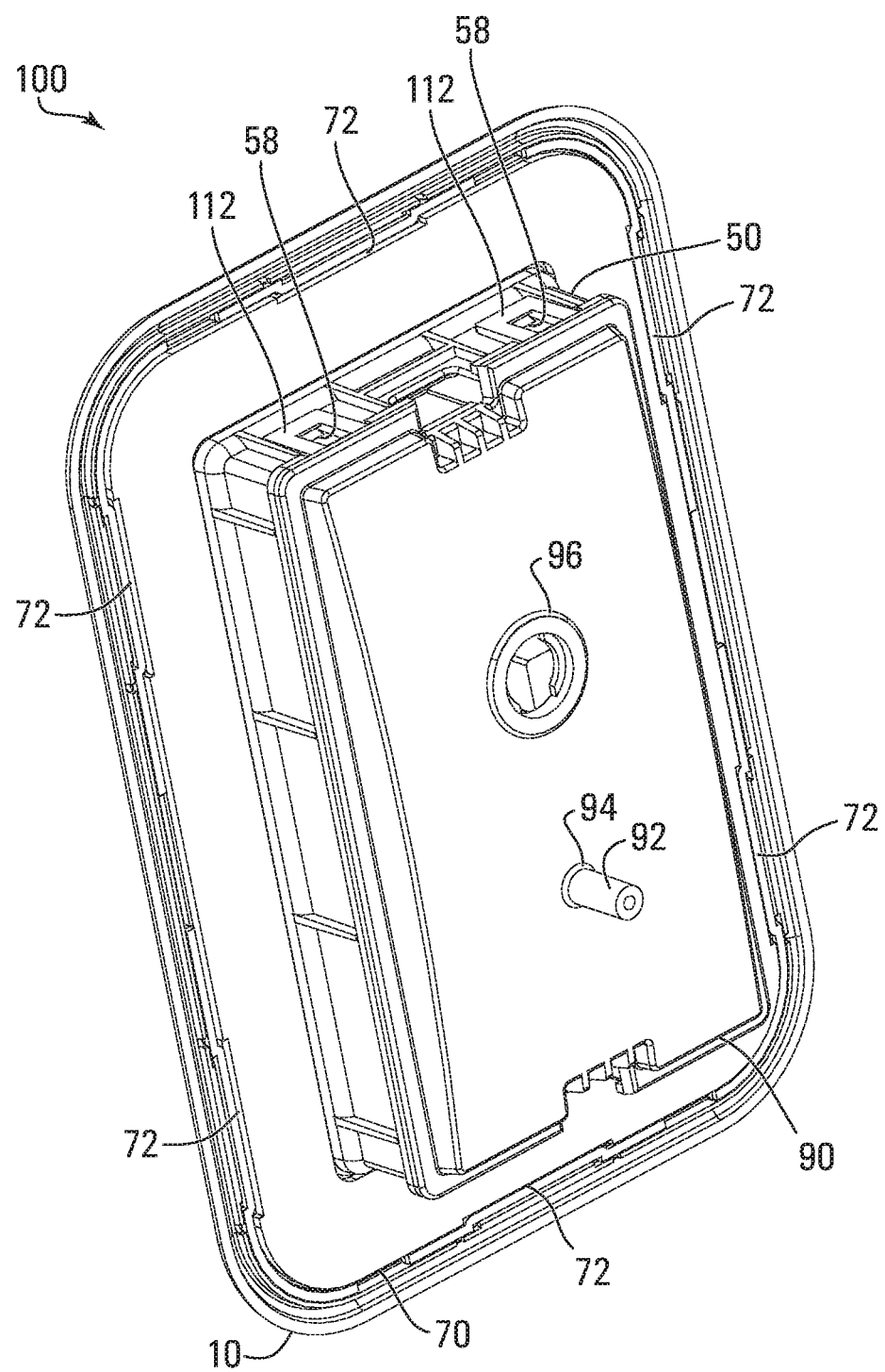
FIG. 2 shows a bottom isometric view of the topside control panel of FIG. 1.
Figure 3:
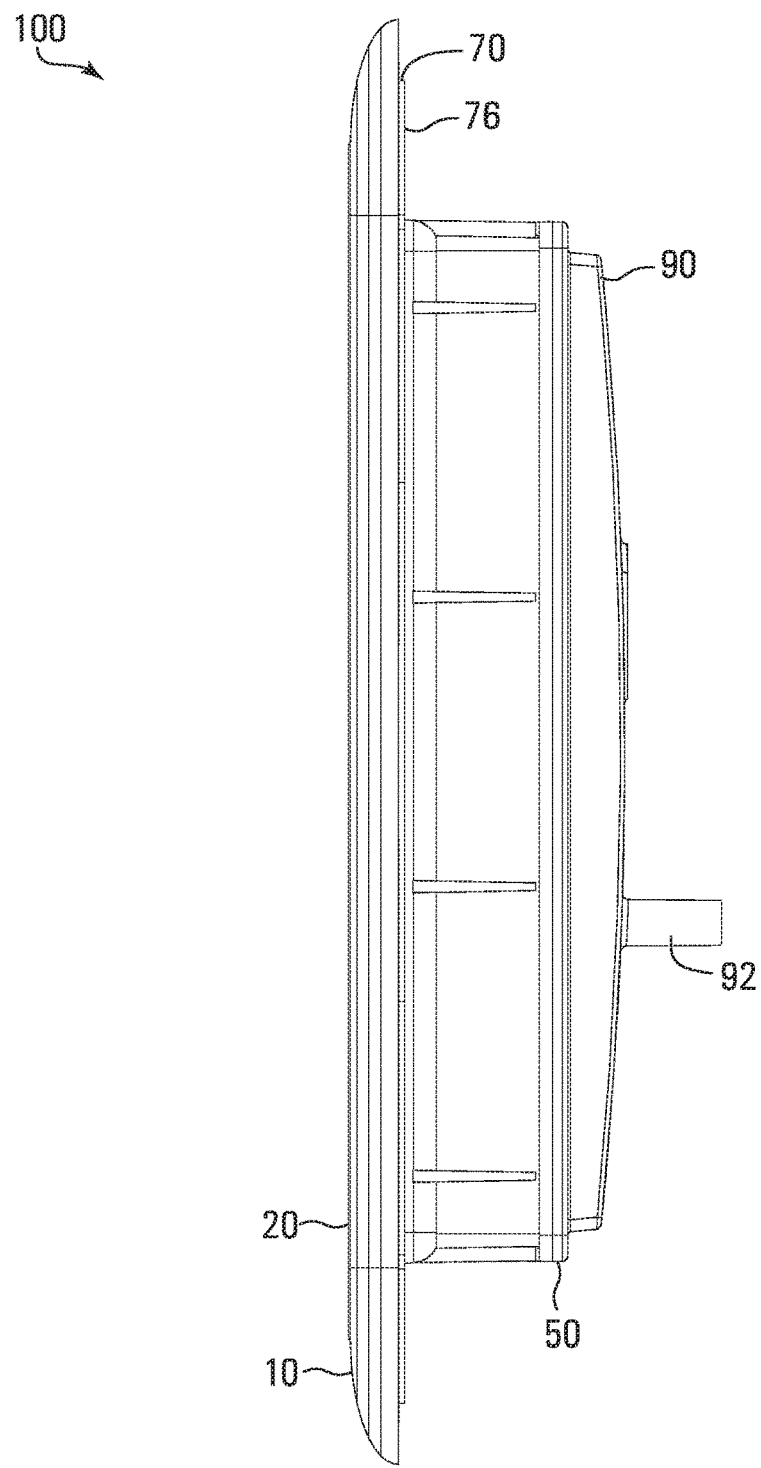
FIG. 3 shows a side view of the topside control panel of FIG. 1.
Figure 4:
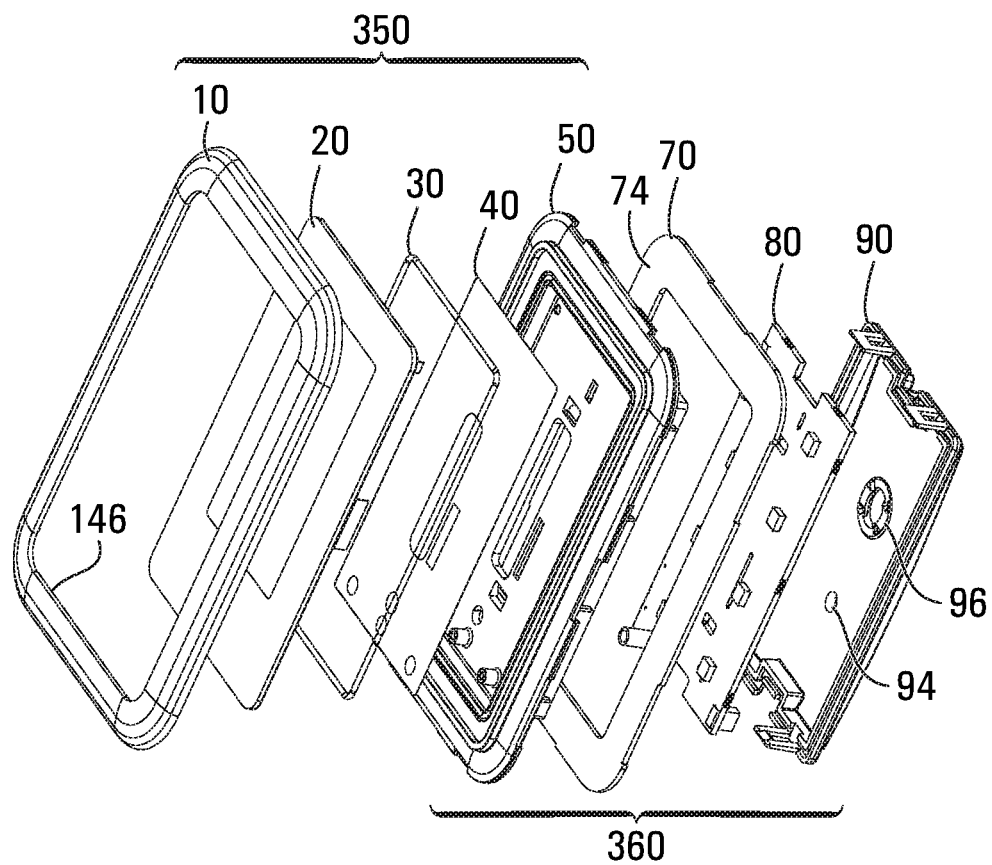
FIG. 4 shows a top isometric exploded view of the topside control panel of FIG. 1 showing a set of disassembled components from a first viewing perspective.
Figure 5:
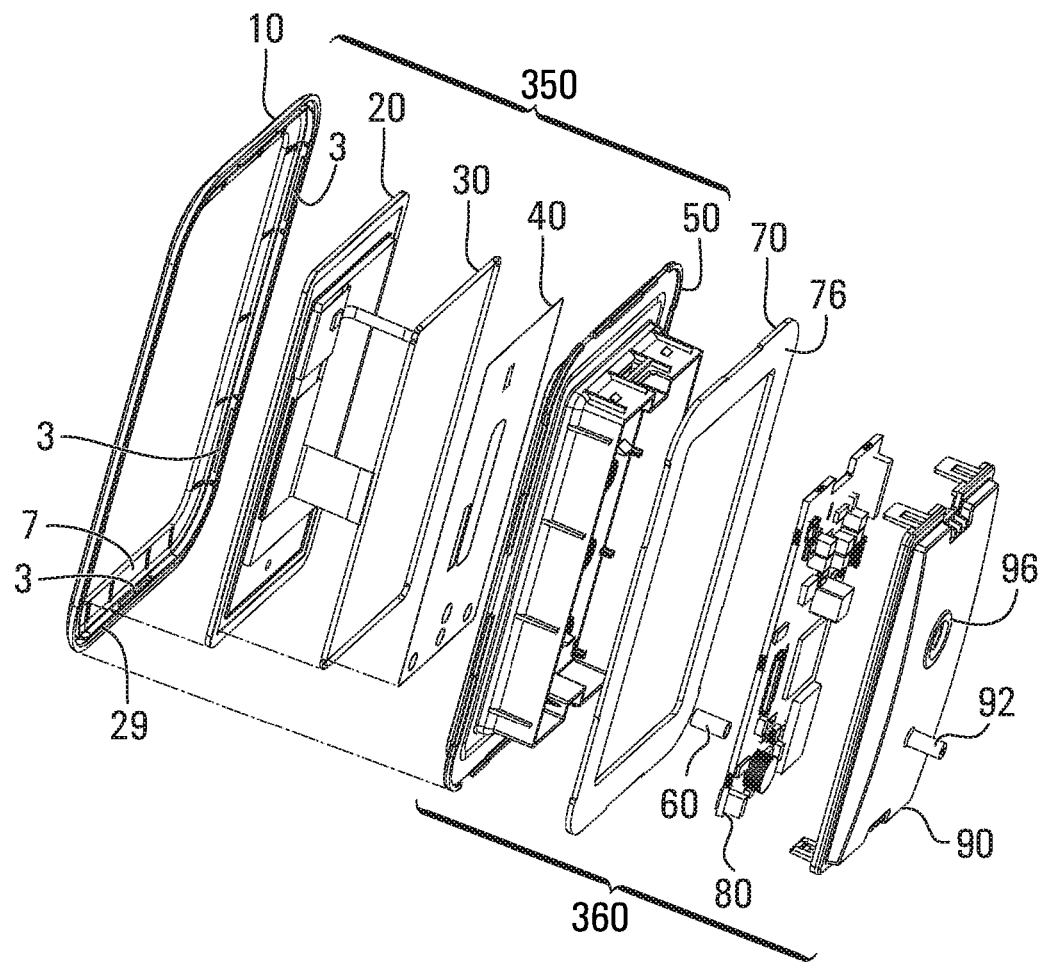
FIG. 5 shows a bottom isometric exploded view of the topside control panel of FIG. 4 showing the set of disassembled components from a second viewing perspective.
Figure 6:
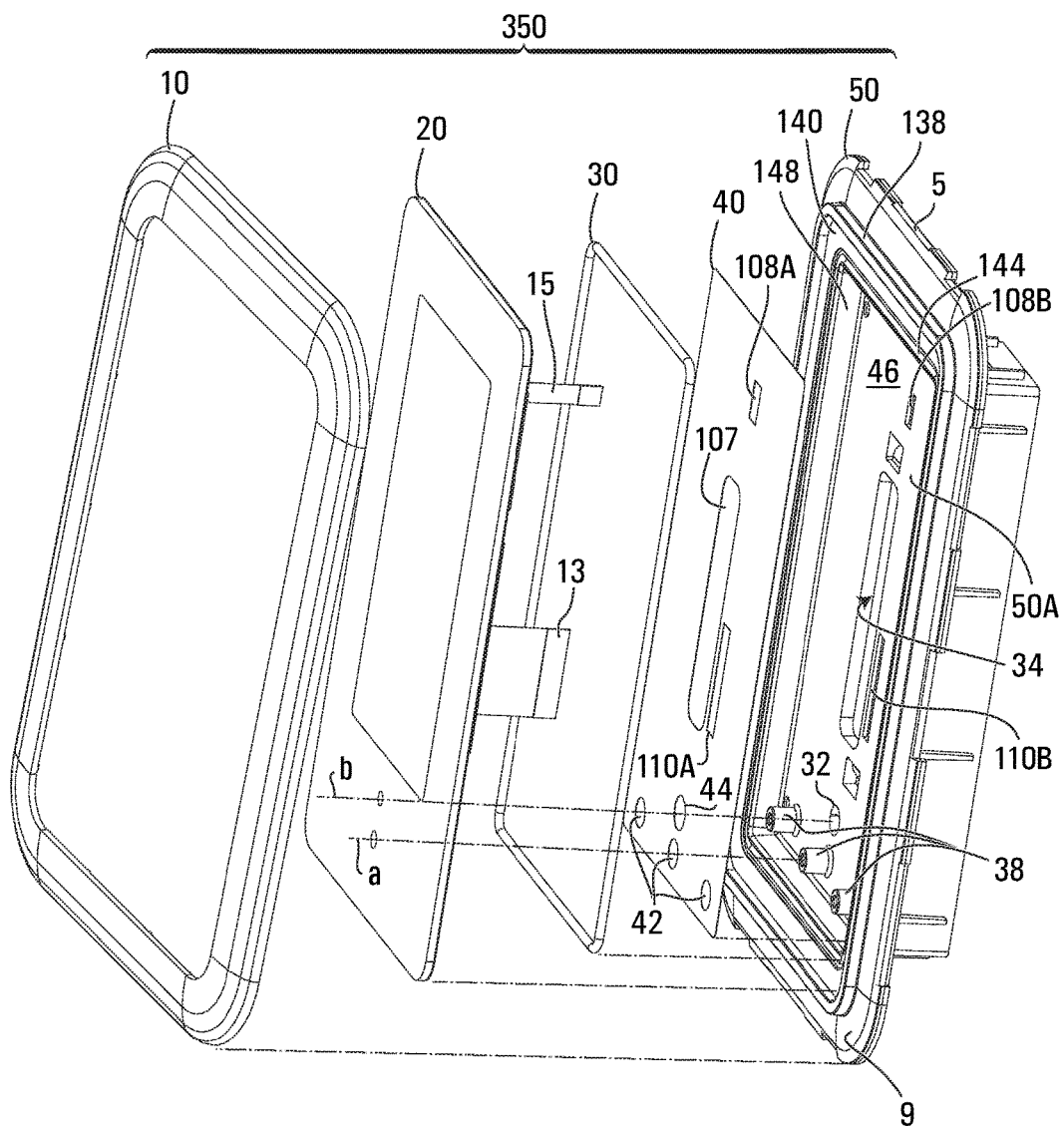
FIG. 6 shows a top isometric exploded view of a first subset of components forming an upper housing subassembly of the topside control panel of FIG. 1 (shown disassembled in FIGS. 4 and 5).
Figure 7:
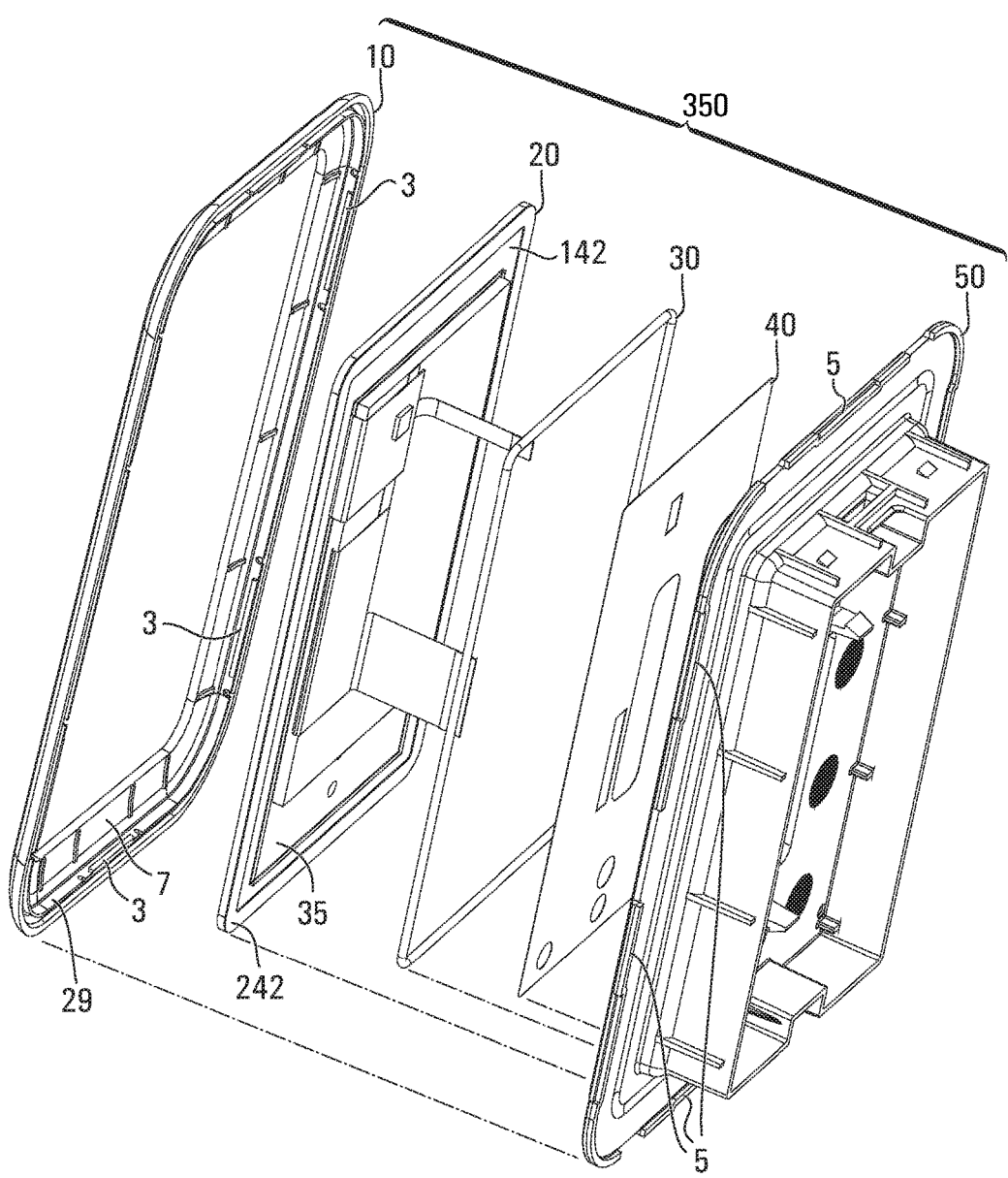
FIG. 7 shows a bottom isometric exploded view of the first subset of components of FIG. 6.
Figure 8:
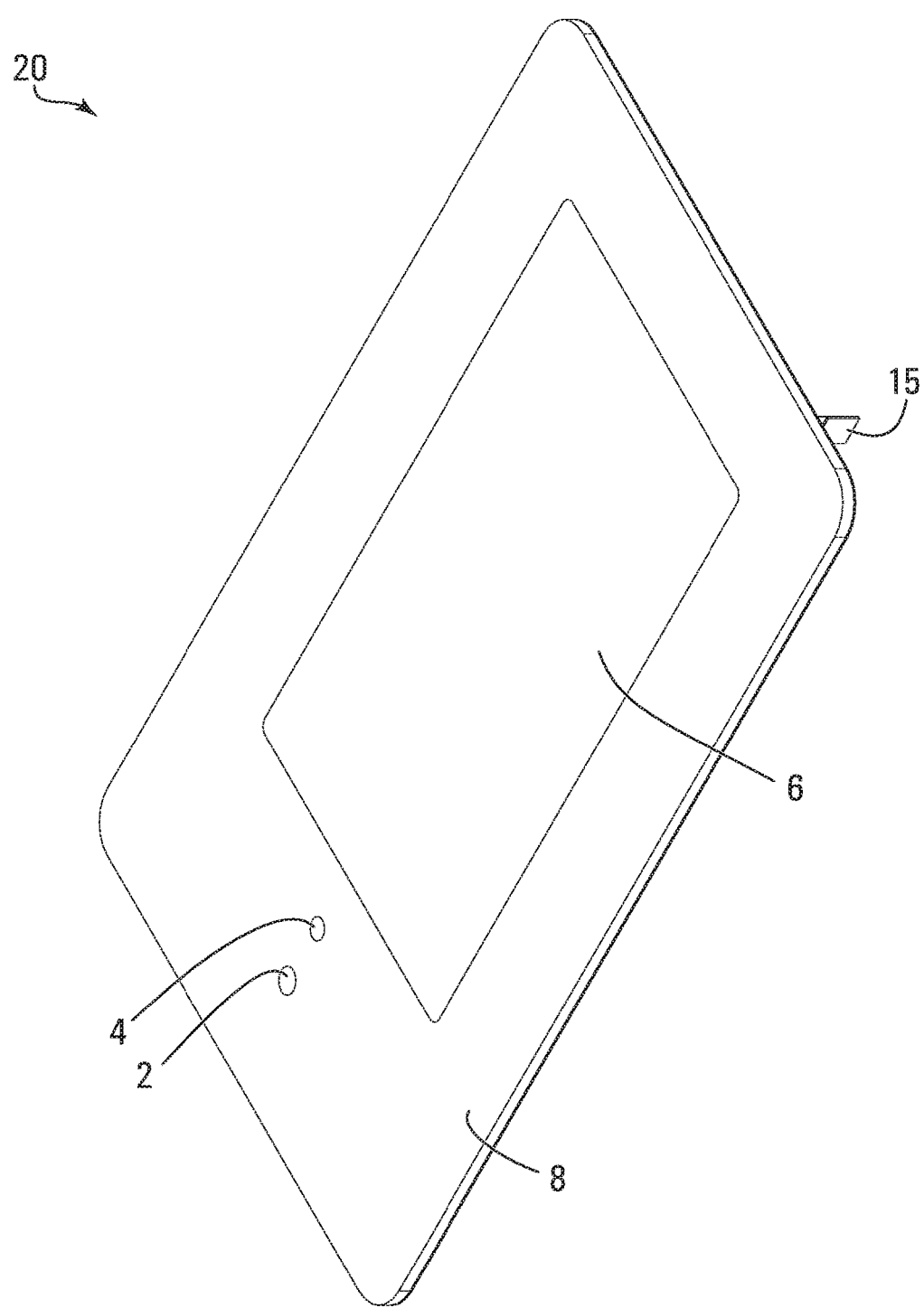
FIG. 8 shows a top isometric view of an LCD/touch screen assembly of the topside control panel of FIG. 1 shown disassembled in FIGS. 4 and 5.
Figure 9:
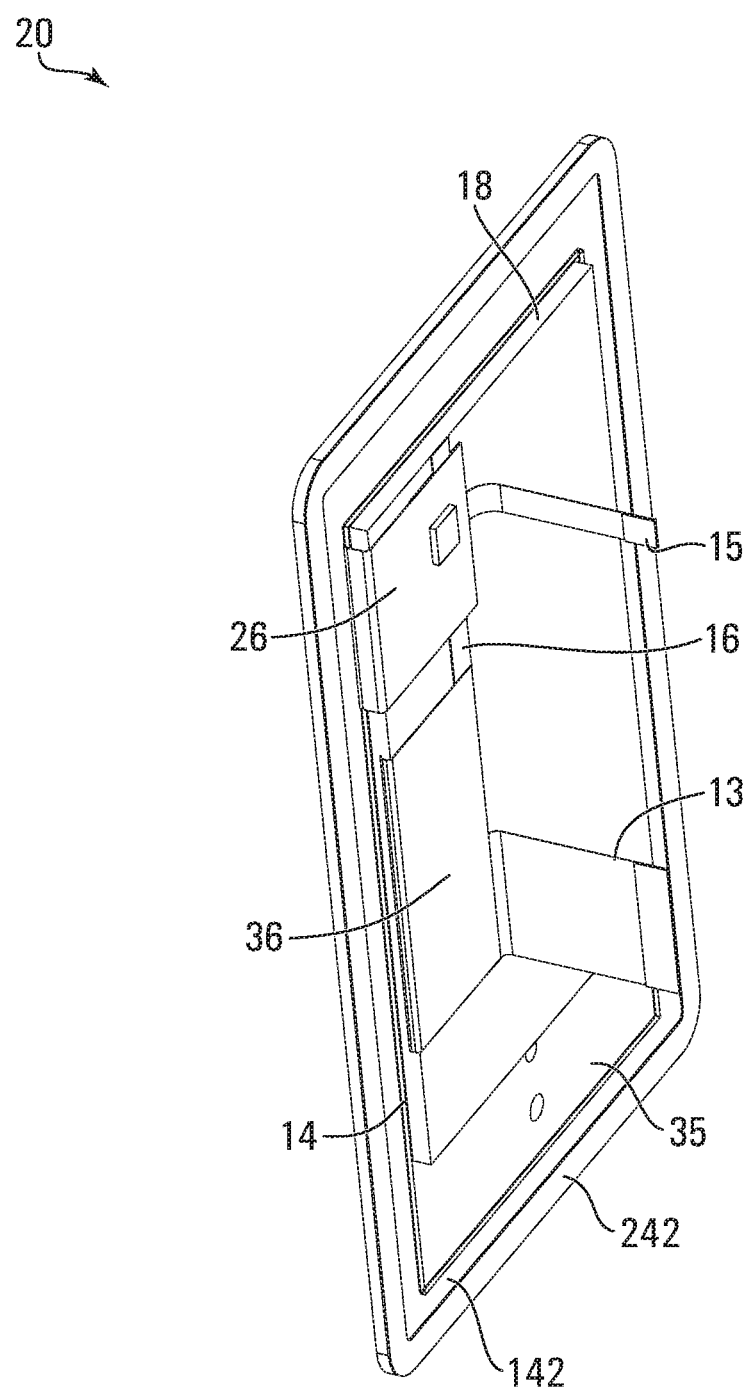
FIG. 9 shows a bottom isometric view of the LCD/touch screen assembly of FIG. 8.
Figure 10:
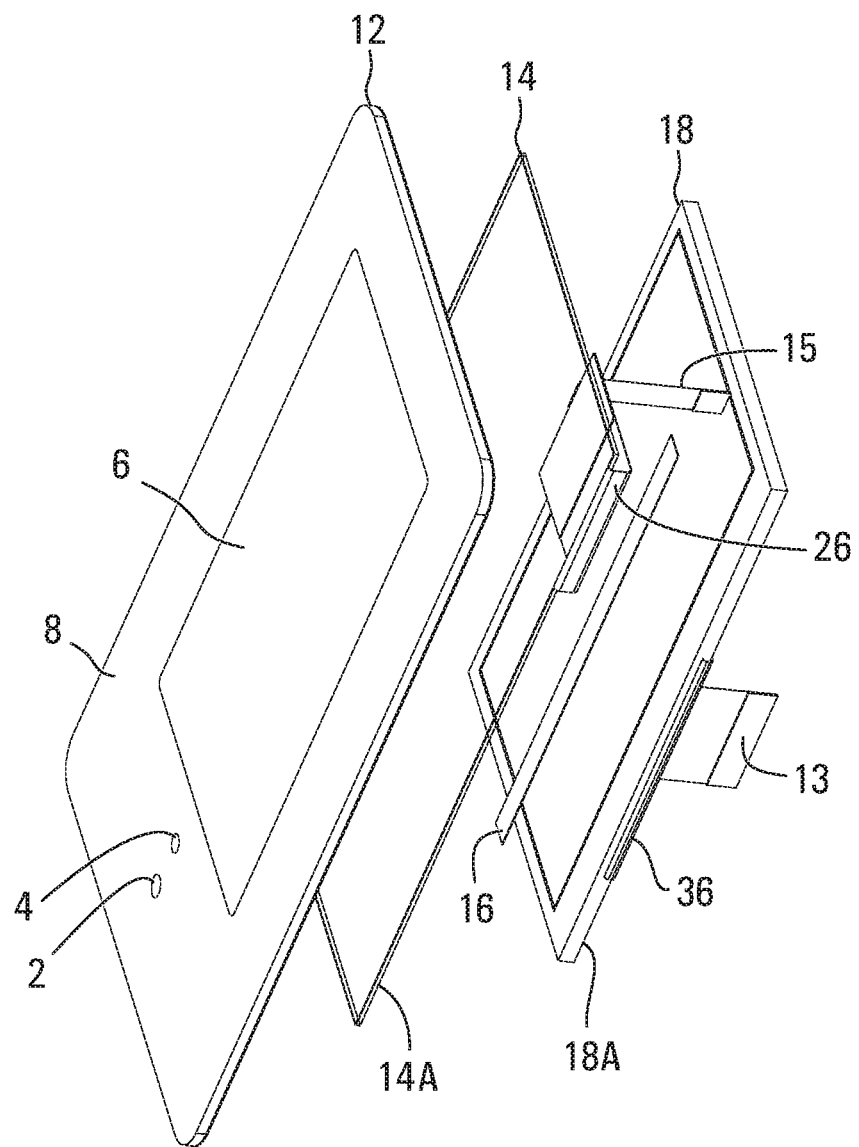
FIG. 10 shows a top isometric exploded view of the LCD/touch screen assembly of FIG. 8.
Figure 11:
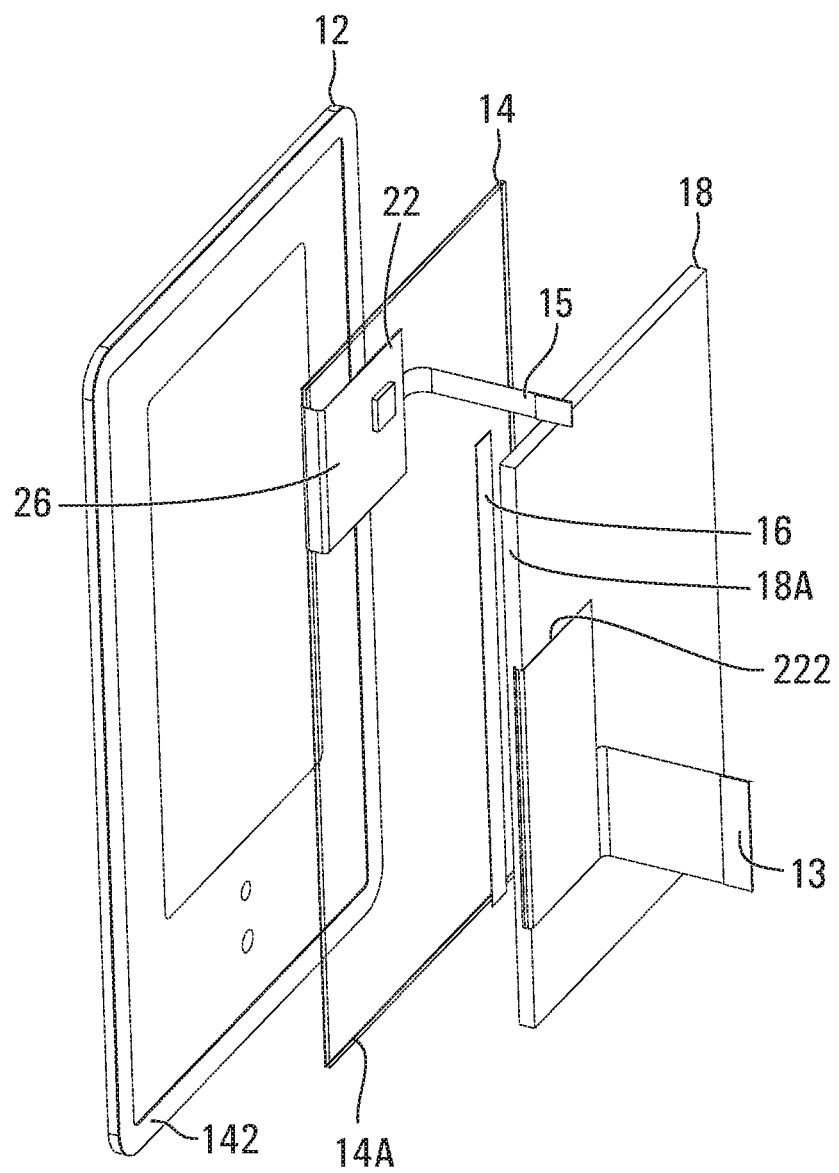
FIG. 11 shows a bottom isometric exploded view of the LCD/touch screen assembly of FIG. 8.
Figure 12:
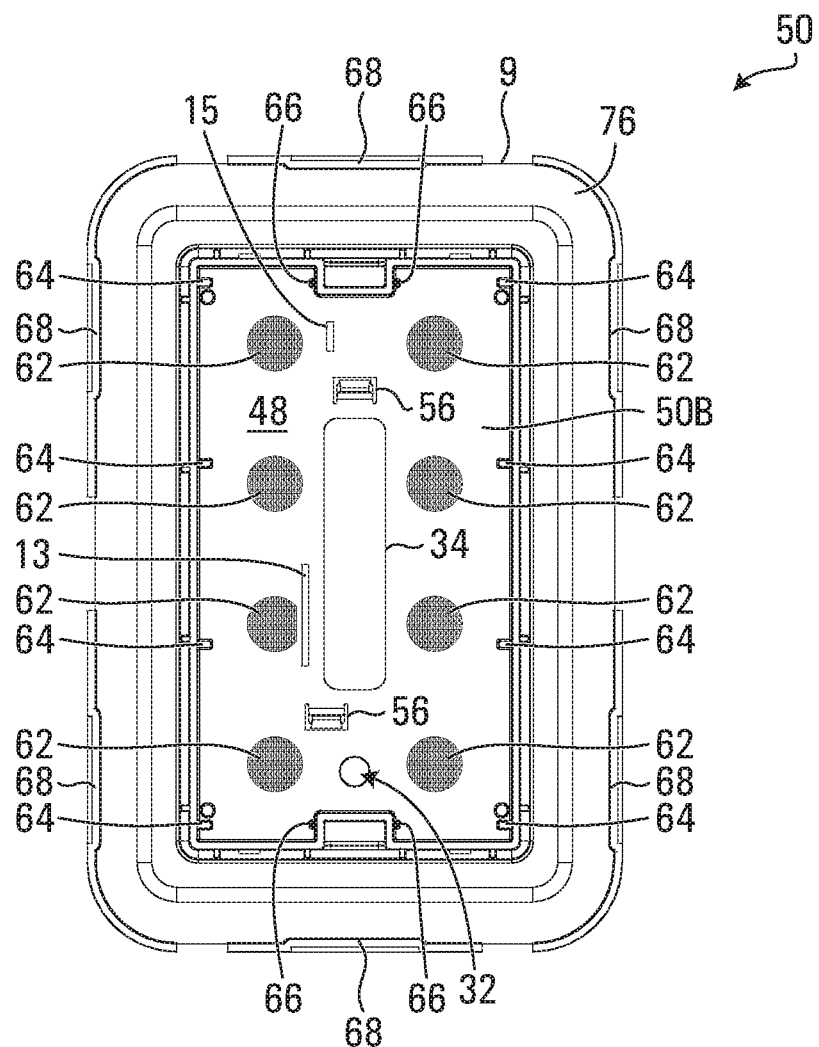
FIG. 12 shows a bottom view of a housing member of the topside control panel of FIG. 1 shown disassembled in FIGS. 4 and 5, the housing member being depicted in the first subset of components shown in FIGS. 6 and 7.
Figure 13:
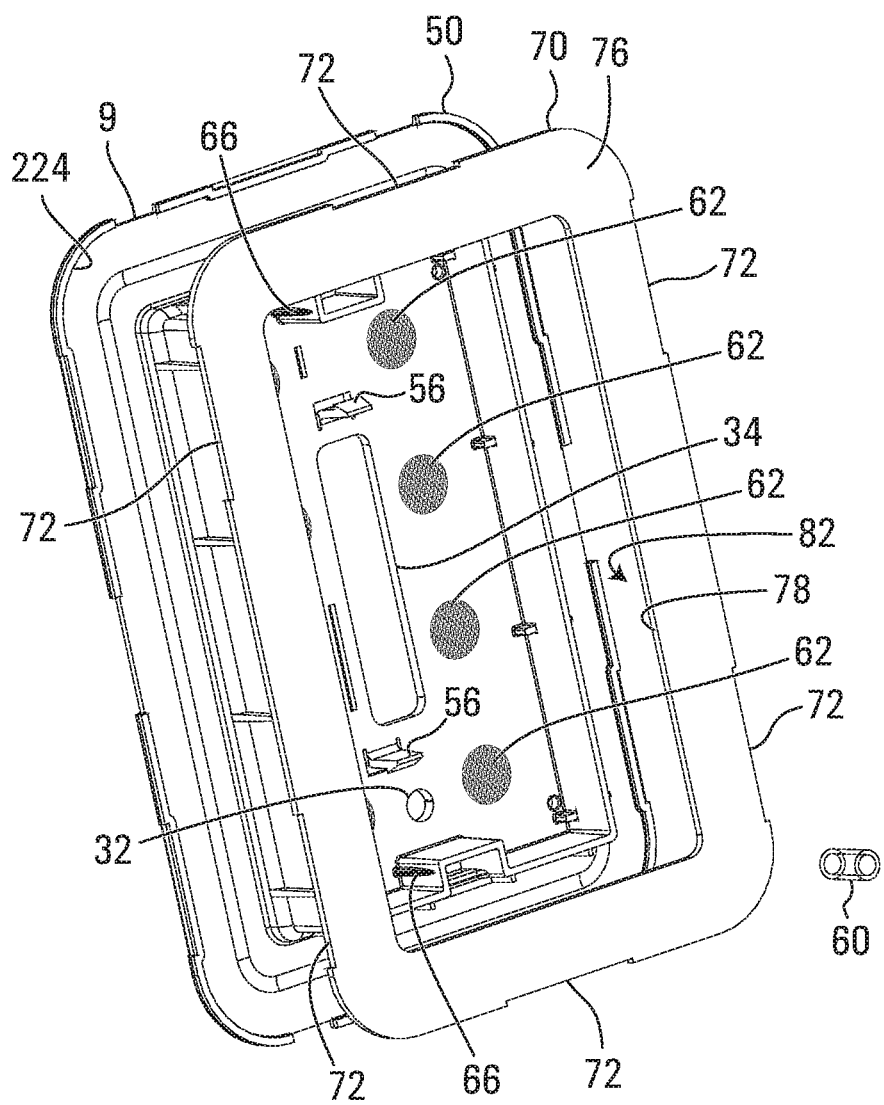
FIG. 13 shows a bottom isometric exploded view of a second subset of components of the topside control panel of FIG. 1 shown disassembled in FIGS. 4 and 5, the second subset of components including the housing member of FIG. 12 and a rear adhesive gasket.
Figure 14:
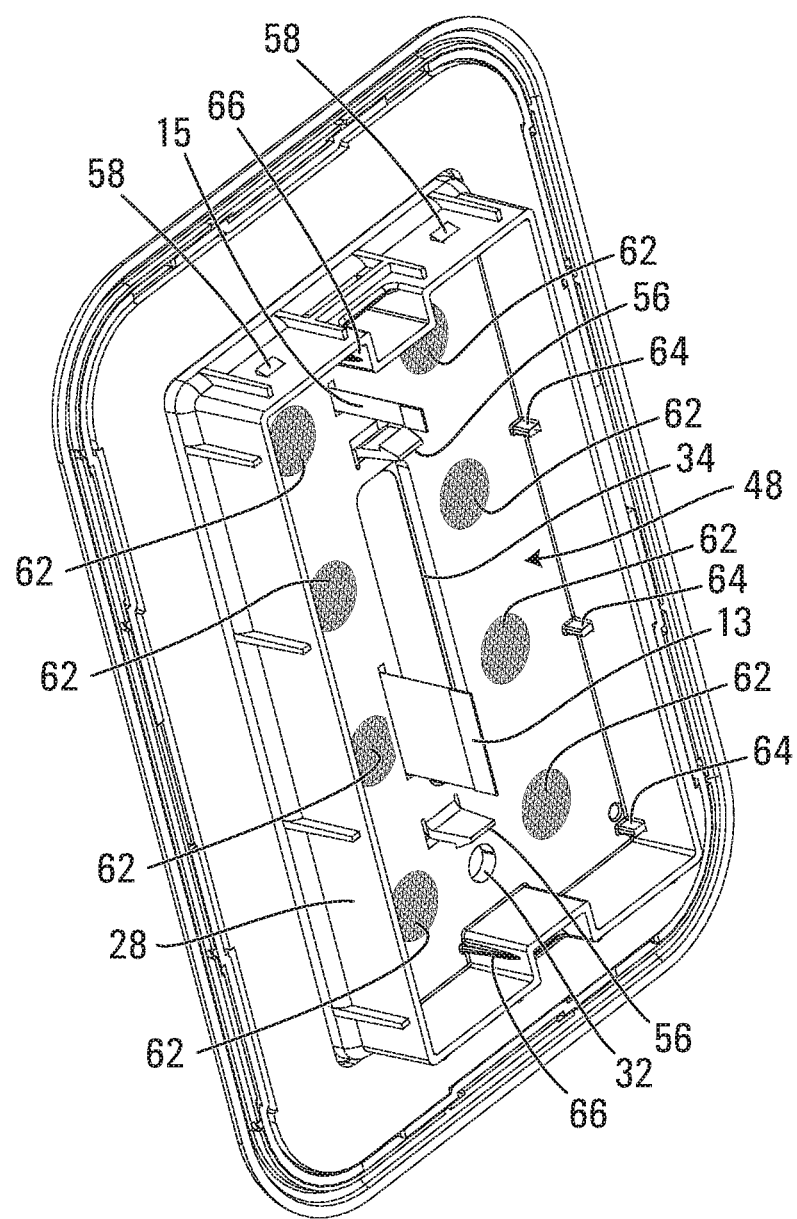
FIG. 14 shows a bottom isometric view of the second subset of components of FIG. 13, in an assembled form.
Figure 15:
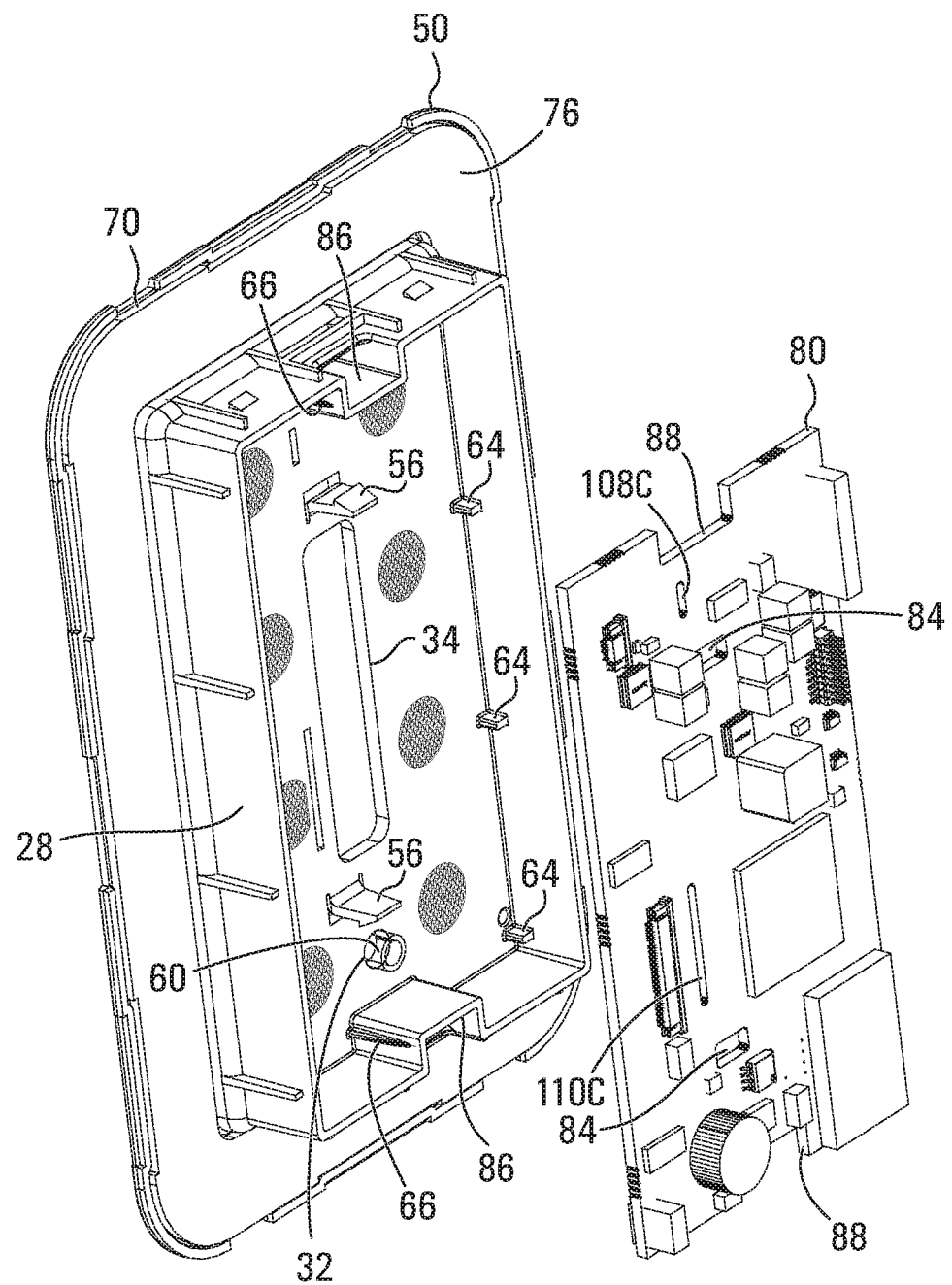
FIG. 15 shows a bottom isometric exploded view of a third subset of components of the of the topside control panel of FIG. 1 shown disassembled in FIGS. 4 and 5, the third subset of components including the second subset of components shown in FIGS. 13 and 14 and a printed circuit board.
Figure 16:
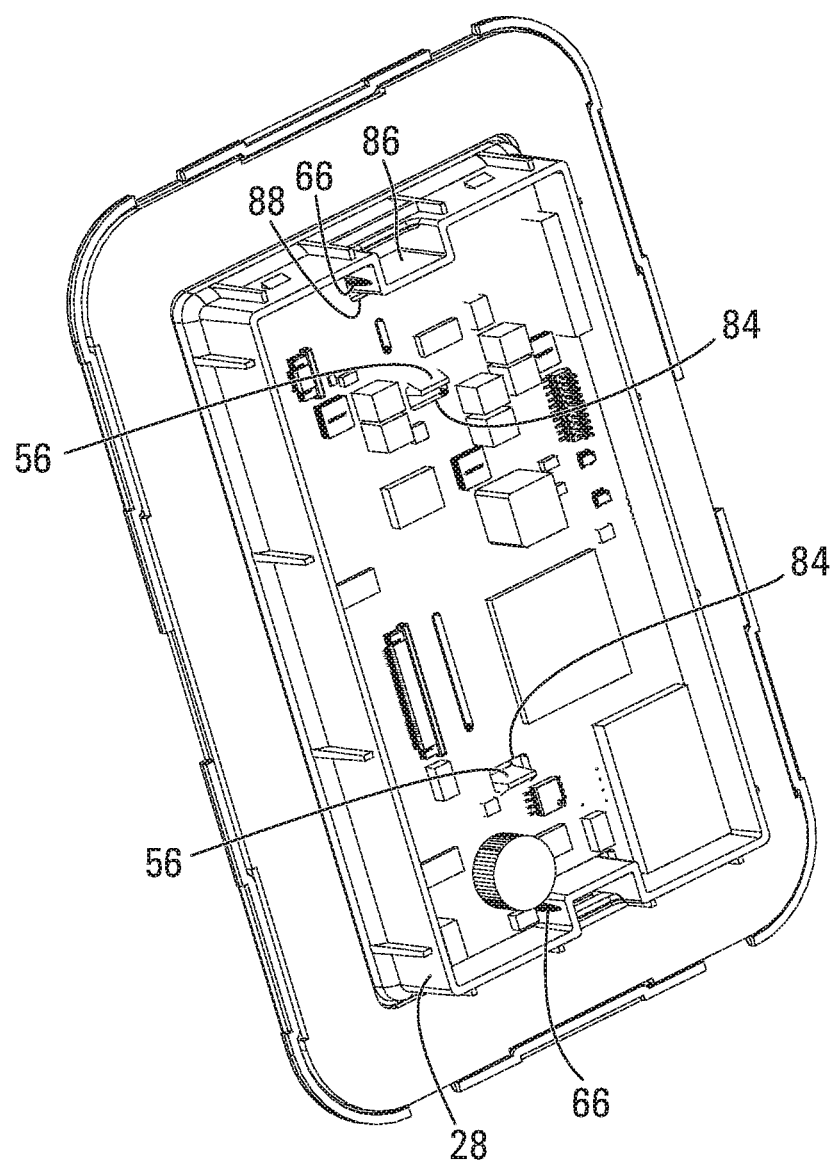
FIG. 16 shows a bottom view of the third subset of components of FIG. 15, in an assembled form.

In the specific example of implementation of the topside control panel 100 shown in FIGS. 1-3, and shown in exploded/disassembled form in FIGS. 4 and 5, the control panel 100 includes a cover frame 10 having an internal wall 146 which is in contact with, or in close proximity to, an outer surface of a peripheral wall 138 of the housing 50. In turn, a LCD/touch screen assembly 20 is positioned in contact with, or in close proximity to, an inner surface of the peripheral wall 138 of the housing 50, in opposite relationship to the cover frame 10. In other words, when viewed from the top of the control panel 100, the peripheral wall 138 forms a ring surrounding the LCD/touch screen assembly 20, and the cover frame 10 surrounds the ring.

The housing 50 and/or the cover frame 10 can be made of any suitable material including plastic, metal or a composite.

The cover frame 10 shown in FIGS. 1-3 is illustrated with a given aesthetic appearance and shape, however it will be apparent that any other aesthetic appearance may be used in alternative implementations. In specific practical implementations, the cover frame 10 may be configured to engage the housing 50 using any suitable fasteners, including mechanical fasteners (for example clips) and adhesives. In some implementations, this type of configuration may allow customizing the visual/aesthetic appearance of the topside control panel by using different shapes and/or color for the cover frame 10 while the remaining components of the topside control panel remain unchanged between different models/designs. In practical implementations the cover frame 10 may be made using plastic material, which can be manufactured at a relatively low cost, potentially allowing the customization of the topside control panel 100 to be done at a relatively low cost.

In non-limiting examples, the cover frame 10 may be configured to releasably engage the housing 50 using any suitable fasteners. Advantageously, embodiments of topside control panels in which the cover frame 10 can releasably engage the housing 50 may allow for the cover frame 10 to be replaced by a user (for example in the case of damage and/or when a different visual appearance is desired) without having to replace a significant portion of the (or entire) top-side control panel 100.

With reference to FIGS. 4-7, which show different portions of the topside control panel 100 in exploded form, it can be seen that the housing 50 includes a top surface 50A circumscribed by a peripheral edge 140 which in the embodiment depicted includes a peripheral wall 148. In the specific example illustrated in FIGS. 4-7, the top surface 50A and the peripheral wall 148 define a recess 46, where the recess 46 is configured for receiving the LCD/touch screen assembly 20 therein.

In the specific example shown in FIGS. 4-7, the top surface 50A of the housing 50 further includes a plurality of standoffs 38 protruding from the top surface 50A, where one of the plurality of standoffs 38 is located generally along an axis b. In practical implementations, the height of the plurality of standoffs 38 is chosen such that at least one of the plurality of standoffs 38 contacts a portion of a bottom surface 35 of the LCD/touch screen assembly 20. While the specific example shown in FIGS. 4-7 illustrates three standoffs 38, alternative embodiments may include more or fewer standoffs. In a specific embodiment, the top surface 50A of the housing 50 may also include an aperture 32 which is located along an axis a.

The peripheral edge 140 includes a groove or channel 144, which extends along a perimeter of the peripheral wall 148. In the embodiments depicted, the peripheral edge surface 140 is circumscribed by a second peripheral wall 138, where the second peripheral wall 138 is for engaging the inner perimeter of the cover frame 10. In a practical implementation, the peripheral edge surface 140 engages a bottom peripheral edge surface 242 of the LCD/touch screen assembly 20.

In the specific example shown in FIGS. 4-7, a sealing material 30, which may be in the form of a gasket seal, may be used to secure the display touch or presence-sensitive assembly 20 to the housing 50. In practical implementations, the sealing material 30 may be positioned within the groove or channel 144 to secure the LCD/touch screen assembly 20 to the housing 50. In an exemplary embodiment, the sealing material 30 can be a flexible and/or rubberized gasket seal or a double sided tape structure and may be comprised of a water resistant adhesive that adheres the peripheral bottom surface 142 of the LCD/touch screen assembly 20 to the peripheral edge 140 of housing 50. In practical implementations, the sealing material 30 may advantageously reduce water infiltration between the LCD/touch screen assembly 20 and the housing 50.

The housing 50 further includes a peripheral flange 9 which is positioned on an outer surface of the second peripheral wall 138. In the specific example illustrated in FIGS. 4-7, the peripheral flange 9 is designed to engage a bottom surface 7 of the cover frame 10 such that, upon assembly, at least a portion of the bottom surface 7 of the cover frame 10 engages at least a portion of a top surface of the peripheral flange 9. In a specific example of implementation, in order to secure the cover frame 10 to the housing 50, the peripheral flange 9 includes one or more recesses 5 on an edge thereof, which accommodate complementary mating projections 3 on an inner surface of an outskirt wall 29 of the cover frame 10. By urging the cover frame 10 downward onto the housing 50 while the projections 3 are axially aligned with the recesses 5, the projections 3 ultimately enter the recesses 5 and the cover frame 10 snaps onto the housing 50. Alternatively, suitable adhesives or other fastening techniques may be used in alternative implementations which will become apparent to the person skilled in the art in view of the present description. In some implementations, the fastener used to couple the cover frame 10 to the housing 50 may be of a releasable type such as to facilitate the fastening, removal and re-fastening of the cover frame 10 to/from the housing 50. In the specific example shown in FIGS. 4-7, a light diffusion plate 40 is positioned on the top surface 50A of the housing 50 such that the peripheral edge of the light diffusion plate 40 is in contact with, or in close proximity to, the meeting portion between upper surface 50A and the first peripheral wall 148. The light diffusion plate 40 includes a number of apertures 42 for receiving the protruding standoffs 38 therethrough, where one aperture is located along the axis b. The light diffusion plate 40 also includes aperture 44 located along the axis a as well as an elongated aperture 107 located substantially in the center of the light diffusion plate 40, and apertures 110A and 108A. The aperture 107 is cooperatively located with corresponding aperture 34 located on the bottom surface 50A of the housing 50, whereas the apertures 110A and 108A are cooperatively located with corresponding apertures 110B and 108B also positioned on the bottom surface 50A of the housing 50. In some alternate implementations, the light diffusion plate 40 can be omitted from, or integrated into, the control panel 100. In specific practical implementations, the light diffusion plate 40 may be constructed using any suitable material to permit light arriving on a rear (lower) surface thereof to diffuse along its periphery and travels towards the periphery of the LCD/touch screen assembly 20. In a non-limiting practical implementation, the light diffusion plate 40 is comprised of a white polyester fabric that is at least partially opaque, however it will be appreciated that any other suitable type of material may be used in alternate implementations.

FIGS. 8-11 show an embodiment of the LCD/touch screen assembly 20 in accordance with a specific configuration. Other suitable LCD/touch screen assembly configuration may be used in alternative implementations.

In the specific embodiment shown in FIGS. 8-11, the LCD/touch screen assembly 20 includes a cover layer 12, which may be made of glass, plastic or any other suitable material. By way of a non-limiting example, the cover layer 12 may be made of a layer of a chemically strengthened glass, such as the Gorilla Glass™ (Corning Inc., NY, U.S.A.). The cover layer 12 may have an exemplary thickness of a few millimeters, for example, but without being limited thereto, 3 mm; other suitable thicknesses, however, may be used in other practical implementations. The cover layer 12 may include an opaque portion 8 and a translucent or transparent portion 6, where the translucent or transparent portion 6 is designed to allow the user to see and interact with the display generated by the LCD/touch screen assembly 20. In one non-limiting embodiment, the cover layer 12 also includes a tactile zone 2 which is located along the axis b shown in FIG. 6, and may also include a transparent or translucent zone 4 which is located along the axis a shown in FIG. 6. The cover layer 12 has a bottom surface 35 which is circumscribed by a bottom peripheral surface 142. As explained earlier, the bottom peripheral surface 142 is designed to contact the sealing material 30, which is positioned in the groove or channel 144 of housing 50. The cover layer 12 further includes a peripheral edge surface 242 which circumscribes the bottom peripheral surface 142. In a practical implementation, when a bottom surface portion of the LCD/touch screen assembly 20 engages the space 46 of the housing 50, the peripheral edge surface 242 engages the peripheral edge surface 140 of the housing 50.

In a practical implementation, the tactile zone 2 allows associating user tactile input to software-implemented actions. In a specific embodiment, the tactile zone 2 provides haptic feedback and/or includes a mechanical actuator to provide a user with the possible of providing commands through a push-button like action.

In a practical implementation, the transparent or translucent zone 4 is associated with an ambient light sensor positioned on the circuit board assembly 80, for example, for automatically adjusting the LCD/touch screen assembly 20 brightness display settings according to software-implemented actions.

In the specific embodiment shown in FIGS. 8-11, the LCD/touch screen assembly 20 further includes a touch/presence-sensitive layer 14 which is located under the cover layer 12. A first wiring element 26 is positioned on a peripheral edge side wall 14A of the touch/presence-sensitive layer 14. The first wiring element 26 is designed to include a flange 22 which extends longitudinally under the bottom surface of the touch/presence-sensitive layer 14 and connects a wiring cable 15, which electrically couples the touch/presence-sensitive layer 14 to the circuit board assembly 80.

In a practical implementation, the touch/presence-sensitive layer 14 can use capacitive sensor technology, in which case it can sense changes in capacitance at areas of the active region of the panel 100 caused by nearness of a user's finger or other object (such as a stylus) to the touch sensitive layer. The panel 100 may therefore be touch or presence-sensitive to the user's finger or other device such as a stylus. The sensitivity of the panel display 100 may typically be adjusted, e.g., through software driver adjustment, so that the user may not need to even physically touch the cover layer to actuate a button or some other activity such as a swipe.

In a practical implementation, the LCD/touch screen assembly 20 is a TFT LCD (thin film transistor liquid crystal display) module. Displays employing other technologies may be used in alternate implementations. Touch/presence-sensitive display assemblies suitable for the purpose of the touch/presence-sensitive layer 14 may be commercially available and thus need not be described in greater detail here.

In the specific embodiment shown in FIGS. 8-11, the LCD/touch screen assembly 20 further includes a display layer 18 which is located under the touch/presence-sensitive layer 14. The display layer 18 includes a second wiring element 36 which is positioned on a peripheral edge side wall 18A of the display layer 18 corresponding to the peripheral edge side wall 14A of the touch/presence-sensitive layer 14 on which is located the first wiring element 26. The second wiring element 36 is designed to include a flange 222 which extends longitudinally under the bottom surface of the display layer 18, and is configured to attach a wiring cable 13, which electrically couples the display layer 18 to the circuit board assembly 80.

In a practical implementation, the display layer 18 engages the touch/presence-sensitive layer 14 using any suitable fasteners, including mechanical fasteners (for example clips) and adhesives. In the specific embodiment shown in FIGS. 8-11, the display layer 18 engages a flange 22 positioned on the first wiring element 26 and is secured to the touch/presence-sensitive layer 14 with an adhesive layer.

In a practical implementation, the display layer 18 and the touch/presence-sensitive layer 14 engage the recess 46 defined by the first peripheral wall 148 and the top surface 50A of the housing 50, whereas the peripheral edge surface portion 242 of the cover layer 12 engages the peripheral edge surface 140 of the housing 50 and may be fastened thereto using any suitable adhesive material. In specific practical implementations, the display layer 18, touch/presence-sensitive layer 14 and cover layer 12 may be bonded to one another using any suitable adhesive in accordance with any suitable technique known in the art. In practical implementations, such a configuration may afford an advantageous reduction in water infiltration into the control panel 100.

The following section now describes in more details a non-limiting example of implementation of the bottom housing subassembly 360.

With reference to FIGS. 12-19, the housing 50 includes a bottom surface 50B circumscribed by a peripheral wall 28, where the bottom surface 50B and the peripheral wall 28 define a recess 48.

The peripheral wall 28 can include projecting portions 86 positioned on respective side wall portions thereof. In the specific embodiment shown in FIGS. 12-19, the peripheral wall 28 includes a pair of projecting portions 86, in an opposite relationship one to the other, and which project inwardly within the recess 48. Each projecting portion projecting portions 86 can include a plurality of securing posts 66, positioned on an inner surface thereof within the recess 48. In the specific embodiment shown in FIGS. 12-19, each projecting portion of the pair of projecting portions 86 includes a pair of securing posts 66. One securing post of the pair of securing posts 66 is positioned on a first respective side wall portion of one of the projecting portions 86, in opposite relationship to the other one securing post of the pair of securing posts 66 which is itself positioned on a second respective side wall portion of the same one of the pair of projecting portions 86. The securing posts 66 protrude from the bottom surface 50B and are designed to narrow in size towards the protruding extremity thereof.

The bottom surface 50B may also include a plurality of standoff posts 64 which also protrude from the bottom surface 50B and which can be positioned peripherally close to, or adjacent to, an inner surface of the peripheral wall 28. Other positioning of the standoff posts 64 on the bottom surface 50B can be used in alternate practical implementations. The standoff posts 64 are designed to have a certain height such that at least some can contact a portion of a top surface of the circuit board assembly 80.

The bottom surface 50B can also include a plurality of mounting brackets 56 protruding from the bottom surface 50B, for securing the circuit board assembly 80 to the housing 50. In the specific embodiment shown in FIGS. 12-19, the bottom surface 50B includes a pair of mounting brackets 56. Other numbers of mounting brackets may be used in alternate practical implementations.

The bottom surface 50B can also include an aperture 32 which opens through the top surface 50A. The aperture 32 is inline along the axis a and is designed to receive a generally hollow connector 60 extending therethrough, which in the example shown is in the form of a hollow cylindrical connector. The connector 60 creates an optical pathway for light signal thereby associating the transparent or translucent zone 4 with an ambient light sensor that may be positioned on the circuit board assembly 80 along the axis a. In specific practical implementations, the use of an ambient light sensor positioned on the circuit board assembly allow adapting the intensity and/or color of the images displayed by the electronic display to be conditioned at least in part on the basis of the detected amount of ambient light, for example to make the displayed images more pleasing to the user of the bathing unit system. Suitable ambient light sensors are commercially available, and as such, will not be further described here.

The bottom surface 50B can also include an aperture 34 which open through top surface 50A thereby creating a ventilation pathway, which may allow ambient moisture to circulate and eventually escape from the control panel 100 to an outside space.

The bottom surface 50B can also include a plurality of light diffuser elements 62, which are shown in FIG. 12-15 allowing the light coming from lighting elements, which may be LEDs for example, positioned on the board assembly 88 to allow light generated by these lighting elements propagate towards for upper/front portion of the top-side control panel 100. In combination with the light diffusion plate 40, the light diffuser elements 62 allow the peripheral wall 138 of the housing 50 to be illuminated, which in some implementations may create a visually pleasing back-lit effect for the top-side control panel 100.

In the specific example shown in FIGS. 12-19, the peripheral flange 9 present on the periphery of the housing 50 has a bottom surface 76, which is circumscribed by a bottom wall 224 positioned on a peripheral edge of the flange 9. The bottom wall 224 includes one or more wall portion(s) 68 which are generally inwardly projected.

In the specific example shown in FIGS. 12-19, an adhesive gasket 70 having an inner peripheral wall 78 and which defines a cut out 82, is designed such that the inner peripheral wall 78 is complementary to the outer surface of peripheral wall 28 of the housing 50. The adhesive gasket 70 is for attaching the top-side control panel 100 on a surface of the bathing unit. In some implementations, the adhesive gasket 70 may also act as a water barrier to prevent water from penetrating within the body of the topside control panel 100. The adhesive gasket 70 may further includes recesses 72 on a peripheral edge thereof, which mate with complementary wall portion(s) 68 of the bottom vertical wall 224 of the housing 50. In a practical implementation, by urging the adhesive gasket 70 upwards onto the housing 50 while the wall portion(s) 68 are axially aligned with the recesses 72, the wall portion(s) 68 ultimately engage the recesses 72 and the adhesive gasket 70 engages the housing 50. Alternatively, the adhesive gasket 70 may be omitted from the control panel 100 or may be integrated as being part of the body of housing 50.

The circuit board assembly 80 is electrically coupled to the LCD/touch screen assembly 20. In specific practical implementations, the circuit board assembly 80 may include one or more processing elements configured to provide software-implemented functionality for operating the top-side control panel 100. The specifics functionality implemented by the processing elements is not critical to the invention and will, therefore, not be further described here. The circuit board's 80 periphery includes a plurality of peripheral recesses 88 which mate with, and are complementary to, the plurality of projection portions 86 on the peripheral wall 28 of the housing 50. In the specific embodiment shown in FIGS. 12-19, the circuit board assembly 80 includes a pair of peripheral recesses 88 to match with, and be complementary to, the pair of projecting portions 86.

The circuit board assembly 80 further includes a plurality of apertures 84 which are designed for engaging the plurality of mounting brackets 56 protruding from the bottom surface 50B of the housing 50. In the specific embodiment shown in FIGS. 12-19, the circuit board assembly 80 includes a pair of apertures 84 which are designed for engaging the pair of mounting brackets 56.

The circuit board assembly 80 further includes apertures 110C and 108C for connecting wiring 13 and 15, respectively. In a practical implementation, apertures 110C and 108C may be cooperatively located with apertures 110B and 108B extending through the bottom and top surface 50B and 50A of the housing 50, as well as with apertures 110A and 108A of light diffusion element 40 (if present).

In some practical implementations, circuit board assembly 80 may include one or more lighting elements, which may be LEDs for example, mounted upon the assembly 80. These lighting elements may be controlled by processing components of the circuit board assembly 80 to generate light effects, which may be propagated to the upper/front portion of the top-side control panel 100. Optionally, light of different colors and/or intensity as well as different light patterns may be generated by providing suitable lighting elements and/or appropriate control functionality on the circuit board assembly 80. Optionally still, the processing elements on the circuit board assembly 80 may be programmed for modulating the images displayed by the LCD/touch screen assembly 20 at least in part based on the type (for example color/intensity and/or pattern) of light generated by the one or more lighting elements. For example the color of the image displayed by the LCD/touch screen assembly 20 may be modulated to create a visually pleasing effect when view in combination with the color and or intensity of the light emitting by the one or more lighting elements.

In a practical implementation, the circuit board assembly 80 is secured in the recess 48 by aligning the plurality of recesses 88 with the plurality of projecting portions 86 and aligning the plurality of apertures 84 with the plurality of mounting brackets 56. Upon urging the circuit board assembly 80 towards the bottom surface 50B, the plurality of recesses 88 ultimately engage the plurality of securing posts 66 positioned on an inner surface of the projecting portions 86, and the plurality of mounting brackets 56 engage the apertures 84 such that the circuit board assembly 80 is secured in the recess 48.

In the specific embodiment shown in FIGS. 1-3, the control panel 100 further includes a back panel 90 which is positioned on the housing 50, in opposite relationship to the cover frame 10.

Figure 17:
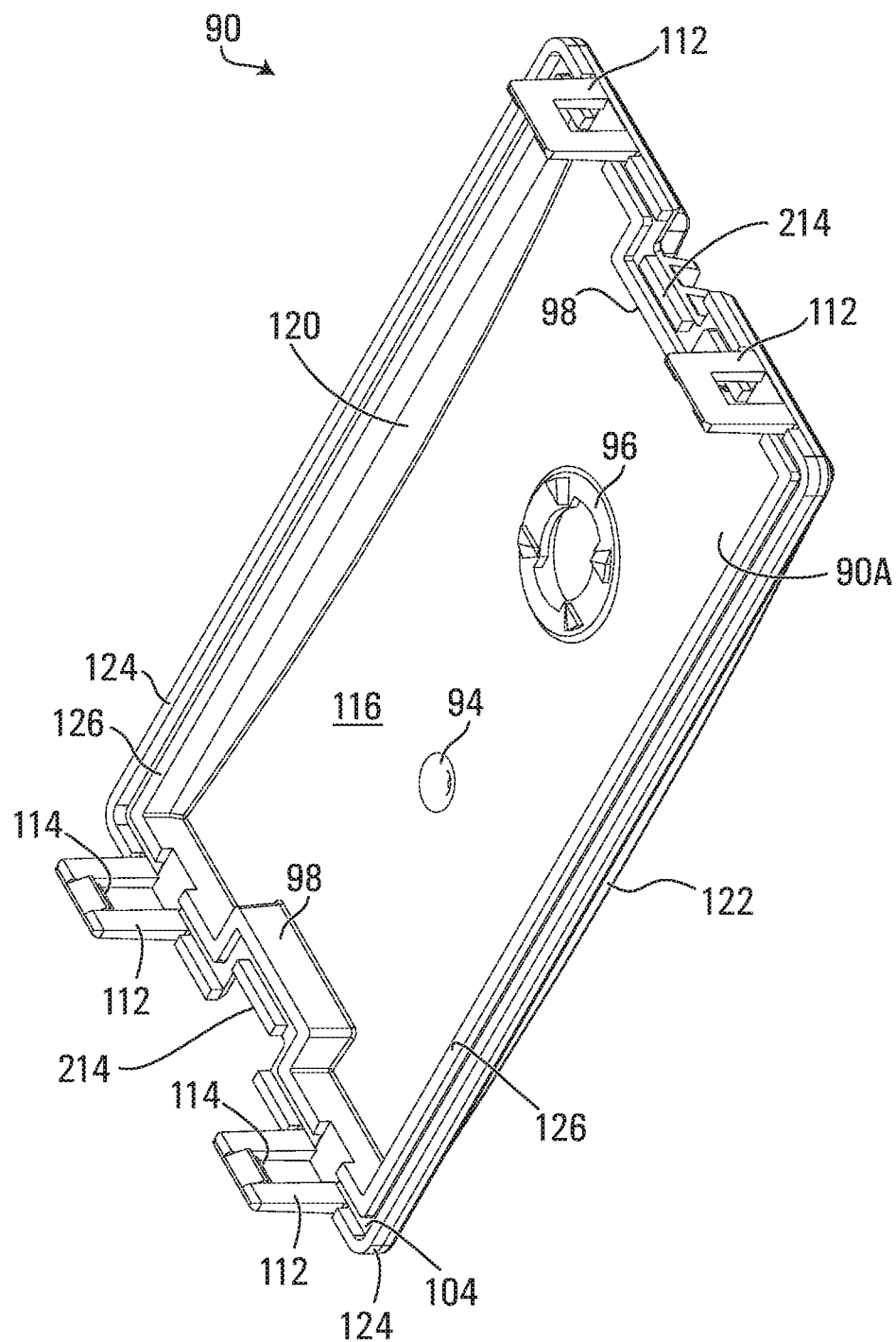
FIG. 17 shows a top isometric view of a back panel component of the topside control panel of FIG. 1 shown disassembled in FIGS. 4 and 5.
Figure 18:
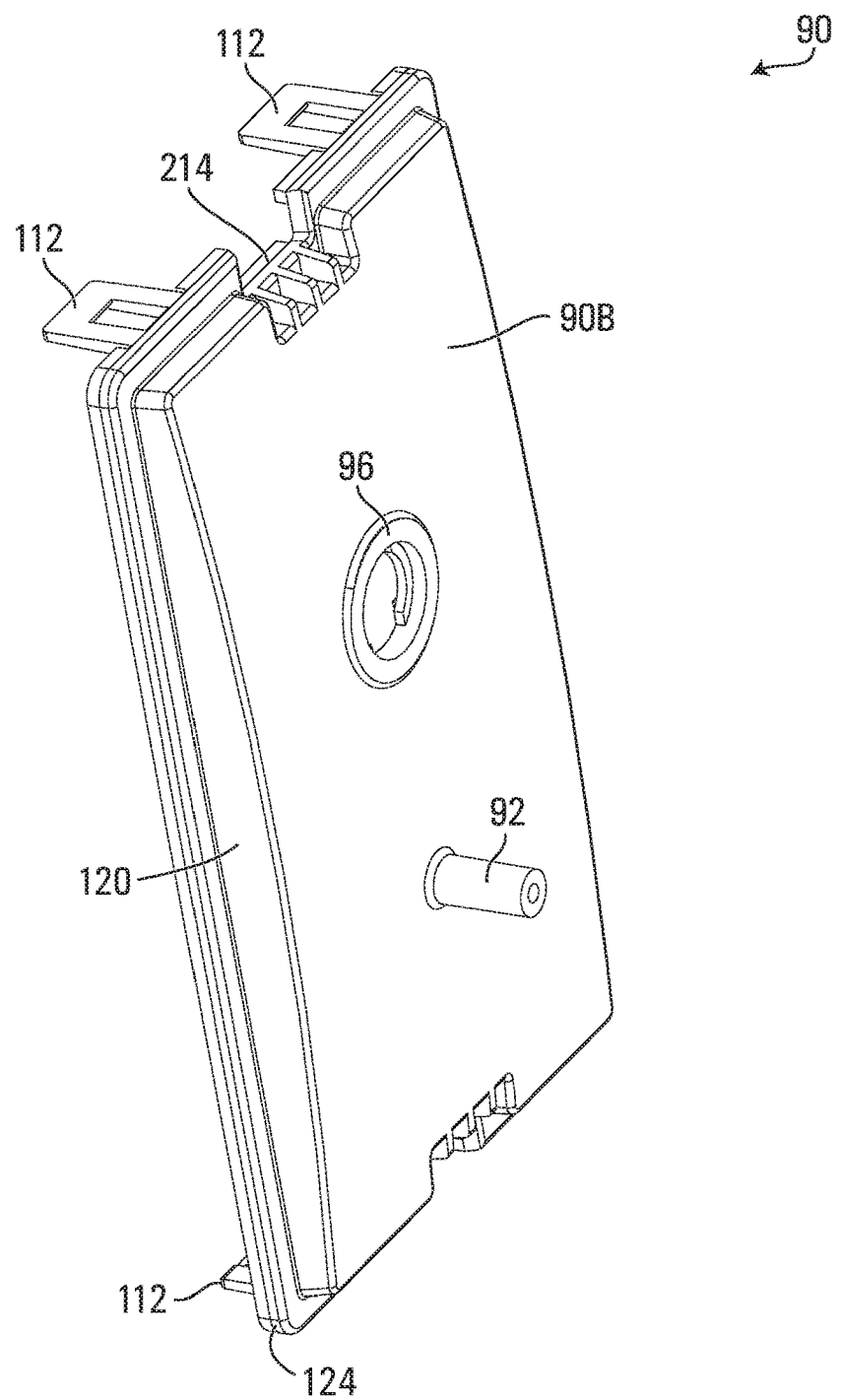
FIG. 18 shows a bottom isometric view of the back panel of FIG. 17.
Figure 19:
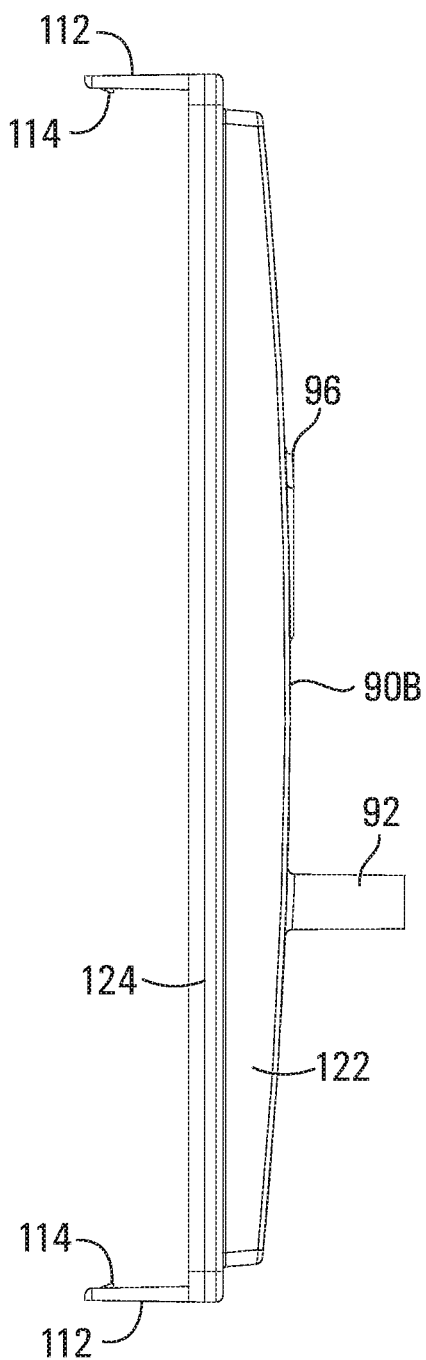
FIG. 19 shows a side view of the back panel of FIG. 17.

FIGS. 17 to 19 better illustrate a specific embodiment of the back panel 90. In this specific embodiment, the back panel 90 includes a top (inner) surface 90A circumscribed with a peripheral wall 126 which, when taken together, define space 116. In a specific example implementation, the top surface 90A has a longitudinal concave shape and the peripheral wall 126, accordingly, includes a longitudinal portion wall 120 which is complementary to the concave shape of the top surface 90A. In a practical implementation, the concave shape may afford an advantageous moisture-\water-controlling effect in providing an air pathway for moisture or water to travel away from water\moisture sensitive elements present within the control panel 100.

The back panel 90 further includes a peripheral edge 124 which circumscribes the top surface 90A. The peripheral edge 124 includes a groove or channel 104 which extends along a perimeter of the peripheral wall 126, where the groove or channel 104 engages the peripheral wall 28 of the housing 50.

In a specific embodiment, the back panel 90 peripheral wall 126 can include a plurality of recessed portion walls 98 where each one thereof has a corresponding one of a plurality of recessed portions 214 on the peripheral edge 124. In the specific embodiment shown in FIGS. 17 to 19, the peripheral wall 126 includes a pair of recessed portions 98 positioned in opposite relationship one to another, on each transversal portion of the peripheral wall 126, where each one of the pair of recessed portions 98 has a corresponding recessed portion 214 on the peripheral edge 124.

In a specific embodiment, the back panel 90 peripheral edge 124 can also include a plurality of mounting brackets 112 extending therefrom for engaging the peripheral wall 28 of the housing 50. In the specific embodiment shown in FIGS. 17 to 19, the peripheral edge 124 includes a pair of mounting brackets 112 positioned on each transversal portions of the peripheral edge 124. Advantageously, each one of the plurality of mounting brackets 112 may include a snapping portion 114 for releasably securing the back panel 90 to the housing 50. In a practical implementation, by urging the back panel 90 upwards onto the housing 50 while each of snapping portion 114 of the plurality of mounting brackets 112 are aligned with a respective one of a plurality of mounting brackets 58 positioned on an outer surface of peripheral wall 28 of the housing 50 (shown in FIG. 14), and while each one of the plurality of recessed portions 214 are aligned with a respective one of the plurality of projecting portions 86, a surface edge of peripheral wall 28 engages into the groove or channel 104, each one of the plurality of snapping portions 114 engages the respective one of the plurality of mounting brackets 58 and each one of the plurality of recessed portions 214 engage the respective one of the plurality of projecting portions 86, resulting in that the back plate 90 snaps onto the housing 50 (the resulting configuration is shown in FIG. 2). While FIGS. 17-19 show a pair of mounting brackets 112 on each of the transversal portion walls of the peripheral edge 124, it will be apparent that any suitable number of mounting brackets 112 may be used in specific alternate practical implementations. Alternatively still, adhesives or other fastening techniques/mechanisms known in the art may be employed in alternate implementations for securing the back plate 90 onto the housing 50.

In a specific embodiment, the back panel 90 includes a ventilation aperture 94 formed on a wall thereof. In a specific embodiment, the aperture 94 is formed on the top surface 90A and is connected to an elongated hollow member 92 extending into a space external to the topside control panel 100. In a practical implementation, the hollow member 92 extending from the aperture 94 formed on a wall of the back panel 90 provides an air communication path between a space internal to the topside control panel 100 and a space external thereto.

The back plate 90 includes a pass-through 96 for connecting a power and signal wiring 134 (shown in FIG. 21) to the circuit board assembly 80. Power and signal wiring elements are known in the art and, as such, will not be further described here.

Figure 20:
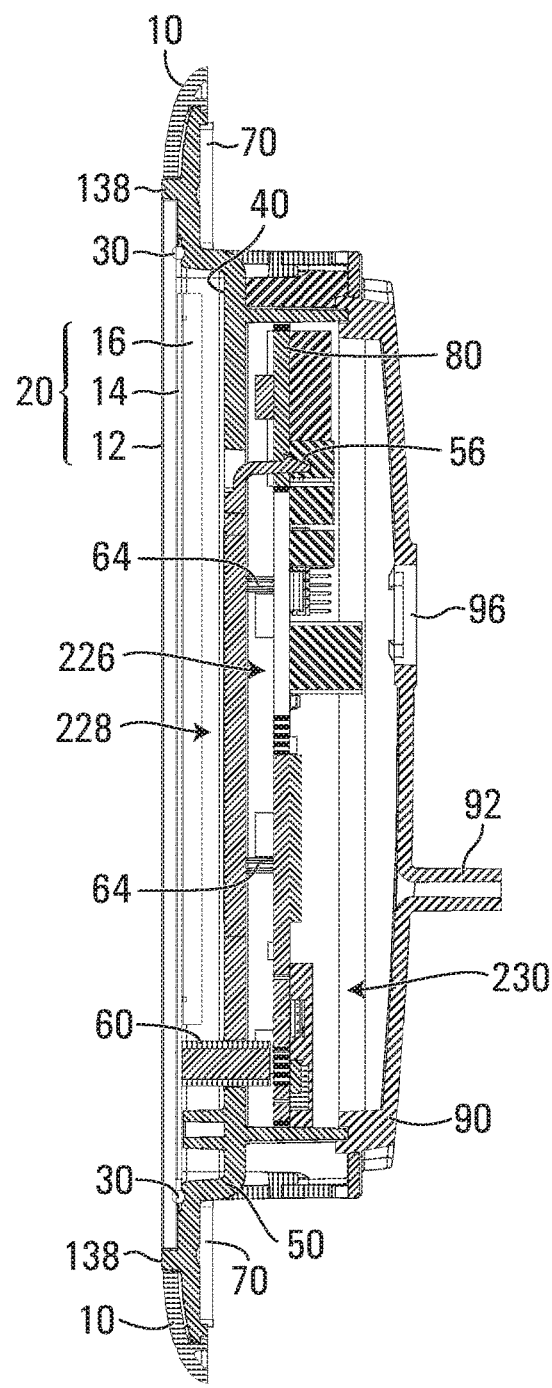
FIG. 20 shows a cross-sectional view taken along line 24-24 of the topside control panel shown in FIG. 1.

With reference to FIG. 20, upon assembly, the topside control panel 100 can include a substantially continuous top surface which appears flush to a user's touch. Alternatively, the topside control panel 100 can include a discontinuous top surface which appears to a user's touch as having physically delimited zones, for example, such discontinuous top surface may provide a delimited LCD-touch screen area and a tactile input area.

In a practical implementation, the topside control panel 100 can also include one or more generally enclosed spaces. For example, an enclosed space 228 can be created when the LCD/touch screen assembly 20 engages the recess 46; an additional or alternate enclosed space 226 can be created between the bottom surface 50B and a top surface of the circuit board assembly 80 when the circuit board assembly 80 is secured within the recess 46; and an additional or alternate enclosed space 230 can be created between a bottom surface of the circuit board assembly 80 and the top surface 90A of the back panel 90 when the circuit board assembly 80 is secured within the recess 46.

In a first type of practical implementation, one or more of the above described enclosed spaces may be filled with a water proof material, such as silicone in order to prevent water from entering these enclosed spaces.

In a second type of practical implementation, one or more of the above described enclosed spaces may remain generally empty (filled at least in part by air). It also has been observed that leaving some empty spaces and allowing air communication between the one or more enclosed space and a space external to the topside control panel 100 may prevent undesirable moisture from accumulating and/or remaining in these enclosed spaces.

Figure 21:
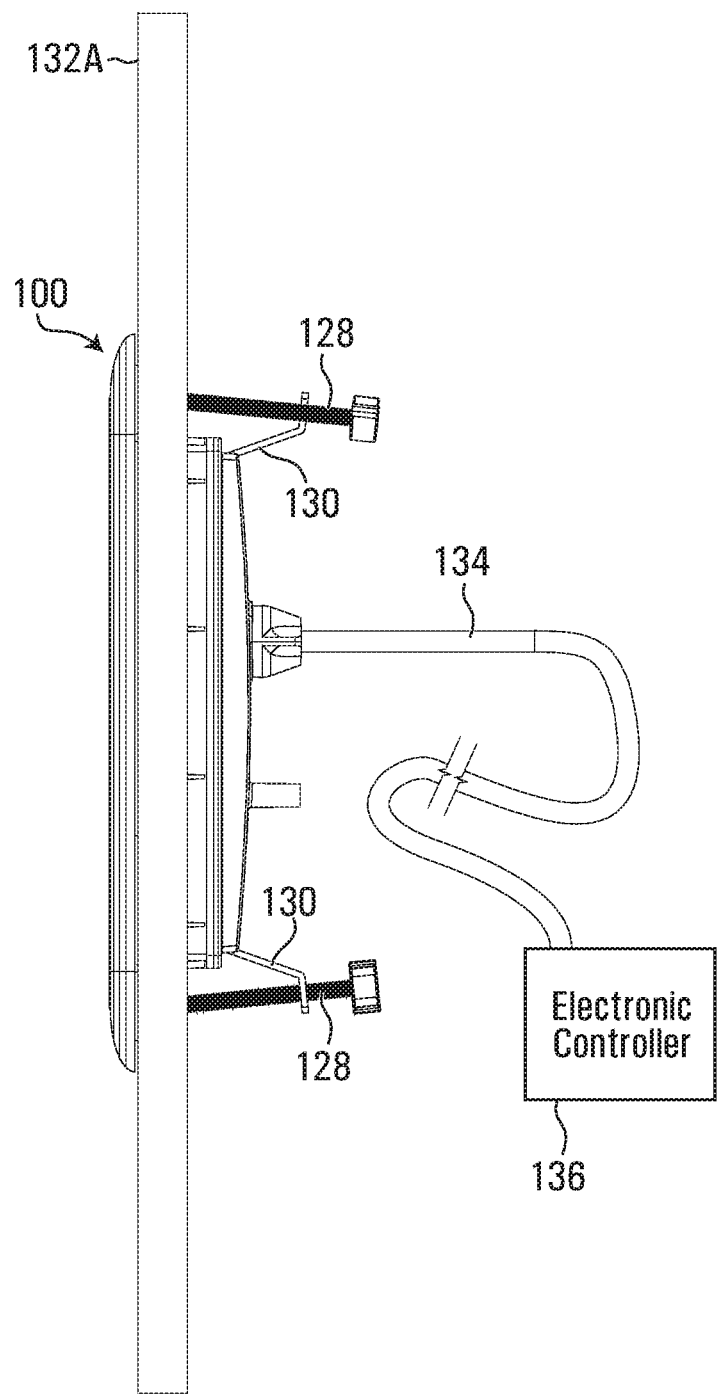
FIG. 21 shows a side view of the control panel of FIG. 1 installed within a wall portion of a bathing unit.
Figure 22:
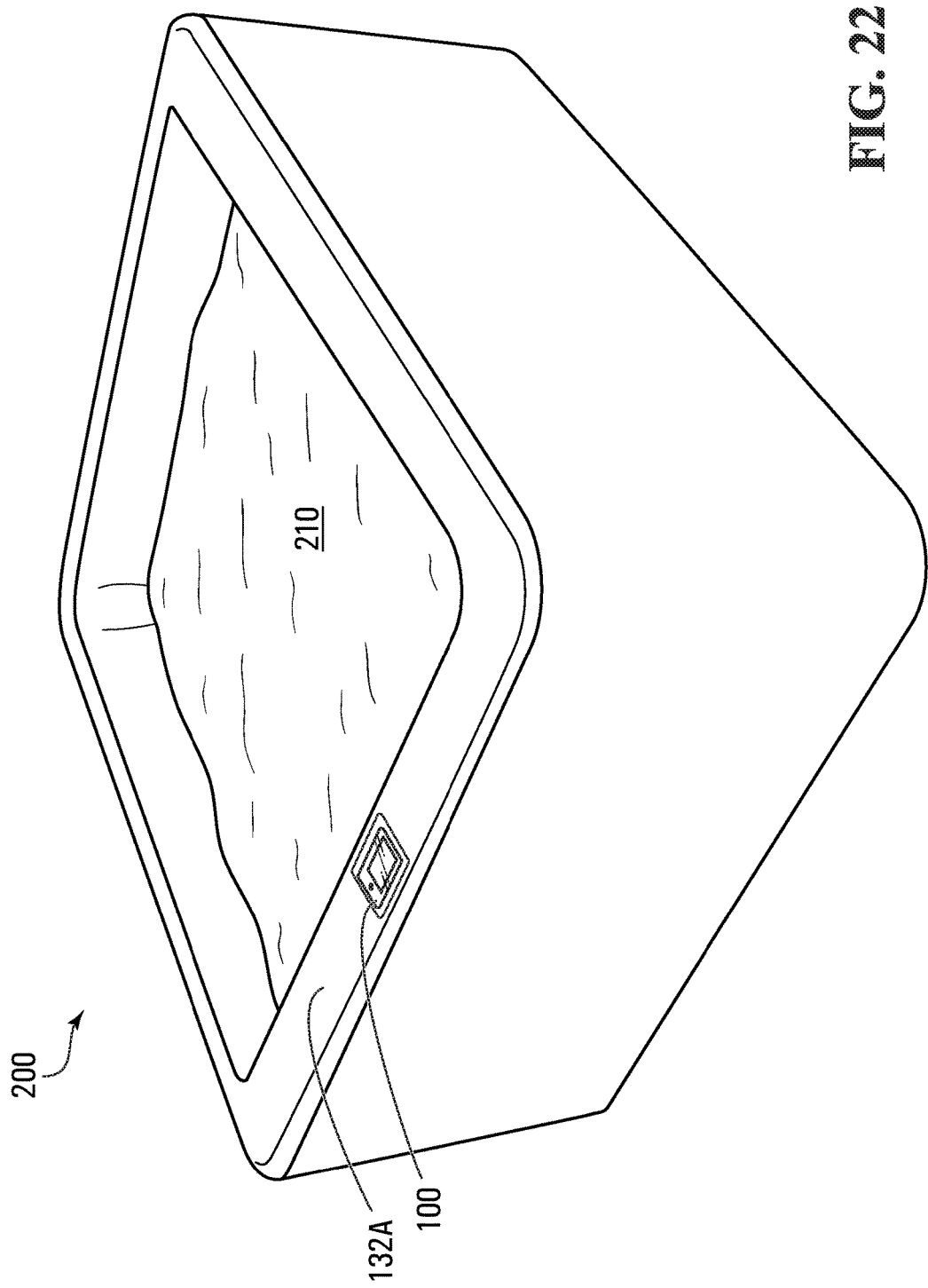
FIG. 22 shows an isometric top view of as bathing unit on which the topside control panel of FIG. 1 is installed on an outer peripheral wall.

FIGS. 21-22 show the topside control panel 100 illustrated in FIGS. 1-20 installed in a bathing unit system 200. An exemplary bathing unit system can be a spa having a spa tub, although it will be appreciated that the subject matter may be practiced in connection with other bathing units, such as whirlpool baths and pools. The bathing unit system 200 includes a receptacle for holding a volume of bathing water 210, a plurality of comfort components including at least a circulation pump and a heater and a controller (shown in FIG. 21) for controlling operational settings associated with the comfort components.

In this exemplary practical implementation, the topside control panel 100 is positioned on an upper portion of a peripheral wall 132A of the receptacle for holding water.

In many typical spa installations, the bathing unit may be fabricated in part using a moldable material, such as fiberglass. The topside control panel 100 may alternatively be installed in bathing units fabricated of other materials, including metal and ceramic materials.

In a practical implementation, the topside control panel 100 may be installed by drilling or otherwise forming an opening in the bathing unit receptacle peripheral wall to form a mount opening, disposing the topside control panel through the mount opening, and securing the topside control panel in place by an adhesive gasket or mounting fasteners. FIG. 21 illustrates an embodiment in which screws 128 secure the topside control panel 100 via mounting fasteners 130 to an underside of peripheral wall 132A. Other suitable fasteners may alternatively be employed in alternative implementations.

In a specific example implementation shown in FIG. 21, a wiring harness 134 is connected between the topside control panel 100 and an electronic controller 136 of the spa installation, such that the topside control panel 100 is in communication with the electronic controller 136 for allowing a user of the bathing unit to control and/or monitor operational settings of at least some of the comfort components in the bathing unit system by using the topside control panel 100. The controller 136 responds to commands entered via the control panel 100 and transmitted electronically over wiring harness 134 to control operational settings of the bathing unit system. In a specific practical implementation, the controller 136 may be a controller of the type described in U.S. Pat. No. 7,419,406 and Canadian Patent 2,499,551, each one being hereby incorporated by reference in their entirety for all purposes.

Figure 23:
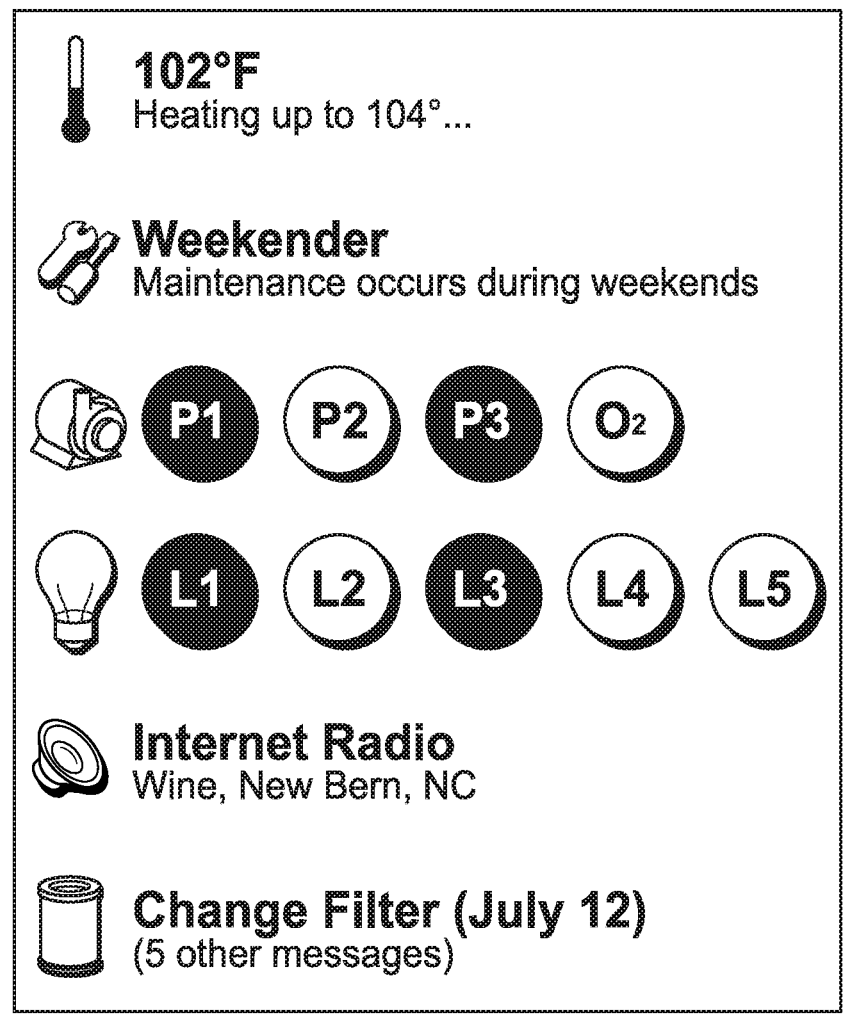
FIG. 23 shows an example of a user interface may be displayed in a viewing area of the topside control panel of FIG. 1 in accordance with a non-limiting example of the present invention.

FIG. 23 illustrates an exemplary display 220 which may be produced with the control panel 100, and showing "button" areas which may be actuated by close proximity or touching of the user finger or stylus. Other suitable display configurations may be envisioned for alternative implementations and will become apparent to the person skilled in the art in view of the present description.

The non-limiting embodiment shown in the Figures only illustrates one specific practical example in which a person of skill may use the concept presented in the present document in order to provide a user with a topside control panel for controlling and/or monitoring component in a bathing unit system. Other practical implementations may be possible. For example, while the topside control panel illustrated in the Figures is of generally rectangular shape, other shapes can also be contemplated in alternative implementations. For instance, it will become apparent to the person of skill that the control panel can have another shape such as, but without being limited thereto, a generally square shape, a generally oval shape, a generally circular shape, a generally triangular shape, and the like. Additionally or alternatively, the topside control panel may include top decorative or informative overlay, optionally including ornamental layers or designs.

Note that titles or subtitles may be used throughout the present disclosure for convenience of a reader, but in no way these should limit the scope of the invention. Moreover, certain theories may be proposed and disclosed herein; however, in no way they, whether they are right or wrong, should limit the scope of the invention so long as the invention is practiced according to the present disclosure without regard for any particular theory or scheme of action.

All references cited throughout the specification are hereby incorporated by reference in their entirety for all purposes.

It will be understood by those of skill in the art that throughout the present specification, the term "a" used before a term encompasses embodiments containing one or more to what the term refers. It will also be understood by those of skill in the art that throughout the present specification, the term "comprising", which is synonymous with "including," "containing," or "characterized by," is inclusive or open-ended and does not exclude additional, un-recited elements or method steps.

Unless otherwise defined, all technical and scientific terms used herein have the same meaning as commonly understood by one of ordinary skill in the art to which this invention pertains. In the case of conflict, the present document, including definitions will control.

As used in the present disclosure, the terms "around", "about" or "approximately" shall generally mean within the error margin generally accepted in the art. Hence, numerical quantities given herein generally include such error margin such that the terms "around", "about" or "approximately" can be inferred if not expressly stated.

Although various embodiments of the invention have been described and illustrated, it will be apparent to those skilled in the art in light of the present description that numerous modifications and variations can be made. The scope of the invention is defined in the appended claims.

The invention claimed is:

1. A topside control panel for a bathing unit, comprising:
 a. a display touch or presence-sensitive assembly;
 b. a supporting structure configured for facilitating mounting of the topside control panel to the bathing unit, said supporting structure forming a dividing wall disposed between the display touch or presence-sensitive assembly and a circuit board assembly, said supporting structure including:
  i. a top surface circumscribed by a top peripheral wall, the top surface and the top peripheral wall defining a first recess for receiving the display touch or presence-sensitive assembly; and
  ii. a bottom surface opposed to the top surface, the bottom surface being circumscribed by a bottom peripheral wall, the bottom surface and the bottom peripheral wall defining a second recess, wherein the circuit board assembly is fastened to the bottom surface of the supporting structure, the circuit board assembly being electrically coupled to the display touch or presence-sensitive assembly; and
 c. a back panel secured to the supporting structure so as to enclose the second recess and form an enclosed space holding the circuit board assembly, wherein a portion of the enclosed space between a surface of the circuit board assembly and the back panel is at least partially filled by air and is configured for enabling air to circulate over at least part of the surface of the circuit board assembly, the back panel including a ventilation member configured for allowing air to flow between the portion of the enclosed space between the surface of the circuit board assembly and the back panel and a space external to the topside control panel to permit moisture in the enclosed space between the surface of the circuit board assembly and the back panel to escape to the space external to the topside control panel.

2. A topside control panel as defined in claim 1, wherein the ventilation member is comprised of an elongated hollow member extending outwardly from an aperture formed on a wall of the back panel.

3. A topside control panel as defined in claim 1, wherein the top surface of the supporting structure is circumscribed by a peripheral edge for engaging the display touch or presence-sensitive assembly.

4. A topside control panel as defined in claim 1, wherein said display touch or presence-sensitive assembly includes:
 a. an electronic display,
 b. a touch or presence-sensitive layer, and
 c. a cover layer overlying a top surface of the touch or presence-sensitive layer.

5. A bathing unit system comprising:
 a. a receptacle for holding water;
 b. a plurality of comfort components including at least a circulation pump and a heater;
 c. a controller for controlling operational settings associated with the comfort components; and
 d. a topside control panel as defined claim 1, the topside control panel being in communication with the controller for allowing a user of the bathing unit system to control and/or monitor operational settings of at least some of the comfort components in the bathing unit system.

6. A bathing unit according to claim 5, wherein the receptacle for holding water includes a peripheral wall and wherein the control panel is positioned on an upper portion of the peripheral wall.

7. A topside control panel as defined in claim 1, wherein said topside control panel further comprises a cover frame, said cover frame defining a cut out area when assembled with the supporting structure for receiving the display touch or presence-sensitive assembly.

8. A topside control panel as defined in claim 7, wherein the supporting structure further includes one or more releasable fastening members for releasably engaging the cover frame to facilitate replacement of the cover frame.

9. A topside control panel as defined in claim 1, wherein the back panel has an inward facing surface opposite the surface of the circuit board assembly, said inward facing surface having a concave shape.

10. A topside control panel as defined in claim 1, wherein said topside control panel comprises a plurality of lighting elements for creating a back-lit effect along a periphery of the display touch or presence-sensitive assembly.

11. A topside control panel as defined in claim 10, wherein said supporting structure includes a plurality of light diffuser elements to allow light from the plurality of lighting elements to propagate towards the upper portion of the top-side control panel to create the back-lit effect along the periphery of the display touch or presence-sensitive assembly.

12. A topside control panel as defined in claim 11, wherein at least some lighting elements of said plurality of lighting elements are positioned on the circuit board assembly.

13. A topside control panel as defined in claim 10, wherein said topside control panel includes a light diffusion plate positioned between the supporting structure and the display touch or presence-sensitive assembly, the light diffusion plate being configured to propagate light from the plurality of lighting elements along the periphery of the display touch or presence-sensitive assembly.

14. A topside control panel for a bathing unit, comprising:
  a. a display touch or presence-sensitive assembly;
  b. a supporting structure configured for facilitating mounting of the topside control panel to the bathing unit, said supporting structure forming a dividing wall disposed between the display touch or presence-sensitive assembly and a circuit board assembly, said supporting structure including:
    i. a top surface circumscribed by a top peripheral wall, the top surface and the top peripheral wall defining a first recess for receiving the display touch or presence-sensitive assembly so as to enclose at least part of the first recess and form a first enclosed space; and
    ii. a bottom surface circumscribed by a bottom peripheral wall, the bottom surface and the bottom peripheral wall defining a second recess holding the circuit board assembly, wherein the circuit board assembly is fastened to the bottom surface of the supporting structure, the circuit board assembly being electrically coupled to the display touch or presence-sensitive assembly; and
  c. a back panel secured to the supporting structure so as to enclose at least part of the second recess to form a second enclosed space defined at least in part by the back panel, the bottom peripheral wall of the supporting structure and a surface of the circuit board assembly;
  wherein a ventilation path is formed between the top surface and the bottom surface of the supporting structure to allow air to flow between the first enclosed space and the second enclosed space and over at least part of the surface of the circuit board assembly.

15. A topside control panel as defined in claim 14, wherein the ventilation path between the top surface and the bottom surface of the supporting structure is a first ventilation path and wherein the back panel includes a ventilation member forming part of a second ventilation path for allowing air to flow between the second enclosed second space and a space external to the topside control panel to permit moisture in the second enclosed space to escape to the space external to the topside control panel.

16. A topside control panel according to claim 15, wherein the ventilation member is comprised of an elongated hollow member extending outwardly from an aperture formed on a wall of the back panel.

17. A topside control panel as defined in claim 14, wherein the circuit board assembly is fastened to the bottom surface of the supporting structure.

18. A topside control panel as defined in claim 14, wherein said topside control panel further comprises a cover frame, said cover frame defining a cut out area when assembled with the supporting structure for receiving the display touch or presence-sensitive assembly.

19. A topside control panel as defined in claim 18, wherein the supporting structure further includes one or more releasable fastening members for releasably engaging the cover frame to facilitate replacement of the cover frame.

20. A topside control panel as defined in claim 14, wherein the back panel has an inward facing surface opposite the surface of the circuit board assembly, said inward facing surface having a concave shape.

21. A topside control panel as defined in claim 14, wherein said topside control panel comprises a plurality of lighting elements for creating a back-lit effect along a periphery of the display touch or presence-sensitive assembly.

22. A topside control panel as defined in claim 21, wherein said supporting structure includes a plurality of light diffuser elements to allow light from the plurality of lighting elements to propagate towards the upper portion of the top-side control panel to create the back-lit effect along the periphery of the display touch or presence-sensitive assembly.

23. A topside control panel as defined in claim 22, wherein at least some lighting elements of said plurality of lighting elements are positioned on the circuit board assembly.

24. A topside control panel as defined in claim 21, wherein said topside control panel includes a light diffusion plate positioned between the supporting structure and the display touch or presence-sensitive assembly, the light diffusion plate being configured to propagate light from the plurality of lighting elements along the periphery of the display touch or presence-sensitive assembly.

\* \* \* \* \*